United States Patent
Yamazaki et al.

(10) Patent No.: US 9,285,568 B2
(45) Date of Patent: Mar. 15, 2016

(54) IMAGE PICKUP LENS AND IMAGE PICKUP UNIT

(71) Applicant: Sony Corporation, Tokyo (JP)

(72) Inventors: Takayuki Yamazaki, Aichi (JP); Kenshi Nabeta, Kumamoto (JP)

(73) Assignee: SONY CORPORATION, Tokyo (JP)

( * ) Notice: Subject to any disclaimer, the term of this patent is extended or adjusted under 35 U.S.C. 154(b) by 109 days.

(21) Appl. No.: 13/945,145

(22) Filed: Jul. 18, 2013

(65) Prior Publication Data

US 2014/0063323 A1    Mar. 6, 2014

(30) Foreign Application Priority Data

Aug. 28, 2012 (JP) ................................. 2012-187995

(51) Int. Cl.
*G02B 9/62* (2006.01)
*G02B 13/18* (2006.01)
*H04N 5/225* (2006.01)
*G02B 13/00* (2006.01)

(52) U.S. Cl.
CPC ............ *G02B 13/18* (2013.01); *G02B 13/0045* (2013.01); *H04N 5/2254* (2013.01)

(58) Field of Classification Search
CPC ..................................... G02B 9/00; G02B 9/62
USPC .......... 348/335; 359/658, 713, 754, 756, 757, 359/759, 760
See application file for complete search history.

(56) References Cited

U.S. PATENT DOCUMENTS

| | | | |
|---|---|---|---|
| 2012/0194726 A1* | 8/2012 | Huang et al. .................. | 348/340 |
| 2013/0070346 A1* | 3/2013 | Hsu et al. ...................... | 359/713 |
| 2013/0314804 A1* | 11/2013 | Kubota et al. ................. | 359/757 |
| 2014/0355135 A1* | 12/2014 | Liao et al. ..................... | 359/713 |

FOREIGN PATENT DOCUMENTS

| | | |
|---|---|---|
| JP | 2010-237407 | 10/2010 |
| JP | 2011/138175 | 7/2011 |

\* cited by examiner

*Primary Examiner* — Lin Ye
*Assistant Examiner* — Chriss Yoder, III
(74) *Attorney, Agent, or Firm* — Hazuki International, LLC

(57) ABSTRACT

An image pickup lens includes: in recited order from object plane toward image plane, a first lens having positive refractive power; a second lens having positive or negative refractive power; a third lens having negative refractive power; a fourth lens having negative refractive power; a fifth lens having positive refractive power; and a sixth lens having negative refractive power and having optical surfaces, an image-sided surface of the optical surfaces having an aspherical shape with one or more inflection points other than an intersection point of the image-sided surface and an optical axis.

11 Claims, 22 Drawing Sheets

EXAMPLE 1

IMAGE PICKUP LENS AND IMAGE PICKUP UNIT

BACKGROUND

The present disclosure relates to an image pickup lens suitable for a compact image pickup unit that uses an image pickup device such as a high-pixel-density CCD (Charge Coupled Device) and a CMOS (Complementary Metal Oxide Semiconductor), for example, an optical sensor, a portable module camera, a web camera, or the like. The present disclosure also relates to an image pickup unit that uses such an image pickup lens.

An image pickup unit, such as a mobile phone with a camera and a digital still camera, that uses a CCD, a CMOS, or the like as a solid-state image pickup device is known. Recently, there has been a high demand for reducing size of such an image pickup unit, and also, a compact image pickup lens having a short total optical length is demanded as an image pickup lens to be mounted thereon. An image pickup unit that has such a compact image pickup lens has been disclosed.

On the other hand, recently, also in the compact image pickup unit such as a mobile phone with a camera, pixel density of the image pickup device has been increased while a size thereof has been reduced, and an image pickup unit provided with an image pickup device having high pixel density of a so-called mega-pixel or more that has resolution of one million pixels or more has been widely used. Accordingly, high lens performance has been demanded in the image pickup lens mounted on the image pickup unit so that the image pickup lens is suitable for the image pickup unit. An image pickup unit that uses an image pickup lens having such high lens performance has been proposed. For example, Japanese Unexamined Patent Application Publication Nos. 2010-237407 (JP2010-237407A) and 2011-138175 (JP2011-138175A) disclose an image pickup lens having a five-lens configuration.

SUMMARY

The image pickup lens disclosed in JP2010-237407A only includes two lenses having negative refractive power in the five-lens configuration. Therefore, Petzval image plane is inclined, resulting in a so-called under inclination. Therefore, a shape of the lens becomes excessively complex in some cases in order to correct the image plane. In this case, it is difficult to achieve reduction in size while maintaining optical performance.

In JP2011-138175A, three lenses having negative refractive power are arranged in the five-lens configuration. As a result, positive refractive power is concentrated on the first lens. Consequently, it is easier to correct Petzal image plane but it is more difficult to correct coma aberration caused by excessive refractive power in the first lens. Therefore, optical performance of the image pickup lens as a whole is not sufficiently satisfied while achieving reduction in size in some cases.

It is desirable to provide a compact image pickup lens and a compact image pickup unit, each having favorable optical characteristics in which various kinds of aberration are favorably corrected.

According to an embodiment of the present disclosure, there is provided an image pickup lens including: in recited order from object plane toward image plane, a first lens having positive refractive power; a second lens having positive or negative refractive power; a third lens having negative refractive power; a fourth lens having negative refractive power; a fifth lens having positive refractive power; and a sixth lens having negative refractive power and having optical surfaces, an image-sided surface of the optical surfaces having an aspherical shape with one or more inflection points other than an intersection point of the image-sided surface and an optical axis.

According to an embodiment of the present disclosure, there is provided an image pickup unit with an image pickup lens and an image pickup device outputting an image pickup signal based on an optical image formed by the image pickup lens, the image pickup lens including: in recited order from object plane toward image plane, a first lens having positive refractive power; a second lens having positive or negative refractive power; a third lens having negative refractive power; a fourth lens having negative refractive power; a fifth lens having positive refractive power; and a sixth lens having negative refractive power and having optical surfaces, an image-sided surface of the optical surfaces having an aspherical shape with one or more inflection points other than an intersection point of the image-sided surface and an optical axis.

In the image pickup lens and the image pickup unit according to the above embodiments of the present disclosure, the six-lens configuration as a whole is adopted and the configuration of each lens is optimized.

According to the image pickup lens and the image pickup unit of the above embodiments of the present disclosure, the six-lens configuration as a whole is adopted and the configuration of each lens is optimized. Therefore, compact size, favorable correction of various kinds of aberration, and favorable optical characteristics are achieved. In particular, three or more lenses having negative refractive power are arranged and power is appropriately allocated between the first and second lenses and between the third and fourth lenses. Therefore, the image pickup lens becomes suitable for increase in size of the image pickup device, increase in pixel density, etc. in accordance with higher resolution, which have not been allowed in a configuration having five or less lenses. Accordingly, the lens having high performance in which various kinds of aberration are favorably corrected is allowed to be provided in a compact configuration and at low cost.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
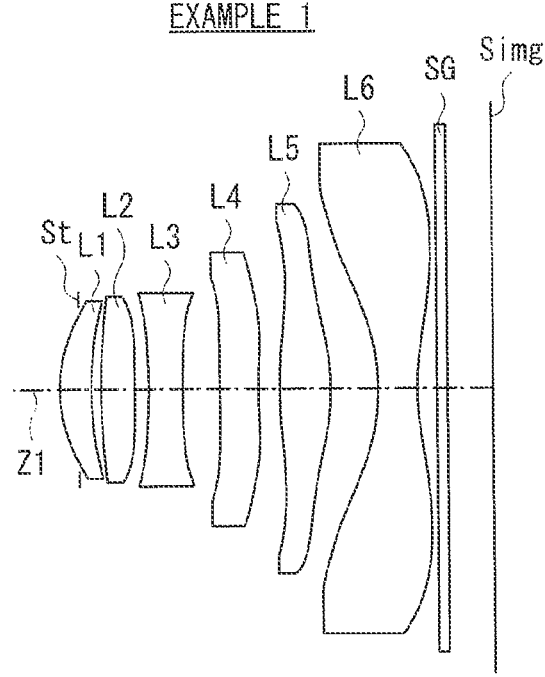
FIG. 1 illustrates a first configuration example of an image pickup lens according to an embodiment of the present disclosure and is a lens cross-sectional view corresponding to Numerical Example 1.

An embodiment of the present disclosure will be described below in detail referring to the drawings. The description will be given in the following order.
1. Basic Configuration of Lenses
2. Functions and Effects
3. Example of Application to Image Pickup Unit
4. Numerical Examples of Lenses
5. Other Embodiments 1. Basic Configuration of Lenses FIG. 1 illustrates a first configuration example of an image pickup lens according to an embodiment of the present disclosure. The first configuration example corresponds to a lens configuration in Numerical Example 1 which will be described later. Similarly, cross-sectional configurations of second to fourteenth configuration examples that correspond to Numerical Examples 2 to 14 which will be described later are shown in FIGS. 2 to 14, respectively. In FIGS. 1 to 14, a symbol Simg represents an image plane and Z1 represents an optical axis.

The image pickup lens according to the present embodiment substantially has a six-lens configuration in which a first lens L1, a second lens L2, a third lens L3, a fourth lens L4, a fifth lens L5, and a sixth lens L6 are arranged along the optical axis Z1 in order from object plane.

The first lens L1 has positive refractive power. The second lens L2 has positive or negative refractive power. The third lens L3 has negative refractive power. The fourth lens L4 has negative refractive power. The fifth lens L5 has positive refractive power. The sixth lens L6 has negative refractive power. An image-sided surface of the sixth lens L6 has an aspherical shape that has an inflection point at which a concave-convex shape is varied in a way from a central portion to a peripheral portion thereof, and has one or more inflection points other than an intersection of the image-sided surface and the optical axis Z1.

Moreover, the image pickup lens according to the present embodiment may preferably satisfy predetermined conditional expressions etc. which will be described later.

2. Functions and Effects

Next, description will be given of functions and effects of the image pickup lens according to the present embodiment.

In the present image pickup lens, the image-sided surface of the sixth lens L6 has an aspherical shape and has one or more inflection points other than the intersection of the image-sided surface and the optical axis Z1. By allowing the image-sided surface of the sixth lens L6 to be the aspherical shape, upward deviation of a principal light ray in accordance with increase in an angle of view is suppressed. Therefore, a light ray is allowed to enter the image pickup device at an appropriate angle. By arranging, in order from the object plane, the first lens L1 having positive refractive power, the second lens L2 having positive or negative refractive power, the third lens L3 having negative refractive power, the fourth lens L4 having negative refractive power, the fifth lens L5 having positive refractive power, and the sixth lens L6 having negative refractive power and allowing the sixth lens L6 to have the above-described aspherical shape, a lens having favorable optical performance is provided.

Since the present image pickup lens is configured of six lenses, both on-axial light ray and off-axial light ray are allowed to be curved moderately. As a result, a position of the aperture stop St that adjusts an amount of light may be set in two ways described below.

In the first way, by arranging the aperture stop St on the object plane side of the first lens L1, an entrance pupil position is allowed to be located at a position far from the image plane. Thus, high telecentric characteristics are secured and incident angle with respect to the image plane is optimized. In the second way, by arranging the aperture stop St between the first lens L1 and the second lens L2, an image-sided surface of the first lens L1 and an object-sided surface of the second lens L2 configure an almost symmetrical shape, which leads to an arrangement that allows aberration that causes peripheral marginal light rays to be canceled. To give a specific example, the aperture stop St is arranged between the first lens L1 and the second lens L2 in the fourth configuration example shown in FIG. 4.

Moreover, in the present image pickup lens, by forming all of the first lens L1 to sixth lens L6 with the use of resin material, a large amount of aspherical lenses are allowed to be used at low cost. On the other hand, when further higher optical performance is necessary, only the first lens L1 or the second lens L2 in the first lens L1 to the sixth lens L6 may be formed of a glass material. This allows the image pickup lens to be suitable for a configuration having higher pixel density. In particular, when the glass material is used, refractive power of a lens in front part of the lens system is allowed to be increased. As a result, minimum angle of deviation of a marginal light ray to determine Fno is allowed to be small. Accordingly, the aperture ratio is allowed to be larger. At the same time, when the glass material is used, an Abbe number having low dispersion is allowed to be selected compared to the case when the resin material is used. As a result, it becomes further easier to correct on-axial chromatic aberration. Therefore, high aberration is allowed to be corrected also in this case.

Moreover, in the image pickup lens, by forming the third lens L3 with the use of a material same as that of the fourth lens L4, manufacturing cost is lowered, and variation in optical performance due to a lot difference in material between the third lens L3 and the fourth lens L4 that have important functions in correcting on-axial chromatic aberration is suppressed to the minimum.

As described above, according to the present embodiment, the six-lens configuration as a whole is adopted and the configuration of each lens is optimized. Therefore, compact size, favorable correction of various kinds of aberration, and favorable optical characteristics are achieved. In particular, three or more lenses having negative refractive power are arranged and power is appropriately allocated between the first lens L1 and the second lens L2 and between the third lens L3 and the fourth lens L4. Therefore, the image pickup lens becomes suitable for increase in size of the image pickup device, increase in pixel density, etc. in accordance with higher resolution, which have not been allowed in a configuration having five or less lenses. Accordingly, the lens having high performance in which various kinds of aberration are favorably corrected is allowed to be provided in a compact configuration and at low cost.

[Description of Conditional Expressions]

In the image pickup lens according to the present embodiment, further favorable performance is obtained by optimizing the configuration of each lens so as to satisfy at least one, and preferably two or more in combination, of the following conditional expressions.

$$14 \leq v3 \leq 35 \tag{1}$$

In the above-described Conditional Expression (1), $v3$ is an Abbe number of the third lens L3.

Conditional Expression (1) defines the Abbe number of the third lens L3. Here, the Abbe number of the third lens L3 largely influences correction of chromatic aberration. If a value of $v3$ in Conditional Expression (1) is larger than the upper limit thereof, refractive power of an f-line, a g-line, etc. is not sufficiently obtained. Therefore, on-axial chromatic aberration is not corrected. It is to be noted that, in order to improve performance by appropriately suppressing the chromatic aberration, the numerical range in the above-described Conditional Expression (1) may be preferably set based on the following Conditional Expression (1)'.

$$18 < v3 < 31 \tag{1'}$$

$$20 \leq v5 \leq 60 \tag{2}$$

In the above-described Conditional Expression (2), $v5$ is an Abbe number of the fifth lens L5.

Conditional Expression (2) defines the Abbe number of the fifth lens L5. Here, the Abbe number of the fifth lens L5 largely influences the correction of the chromatic aberration as that of the third lens L3. If a value of $v5$ in Conditional Expression (2) is larger than the upper limit thereof, refractive power of the f-line, g-line, etc. that pass through the periphery thereof having high image height is not obtained. Therefore, magnification chromatic aberration is not suppressed. If the value of $v5$ in Conditional Expression (2) is smaller than the lower limit thereof, refractive power of the f-line, g-line, etc. that pass through a paraxial region of the fifth lens L5 becomes excessively strong. As a result, the on-axial chromatic aberration is not suppressed.

$$0.4 \leq f1to2/f \leq 1.0 \tag{3}$$

In the above-described Conditional Expression (3), f is a focal length of whole system of the lens, and f1to2 is a combined focal length of the first lens L1 and the second lens L2.

Conditional Expression (3) defines a relationship of a focal length of the whole system with respect to the combined focal length of the first lens L1 and the second lens L2. Here, the combined focal length of the first lens L1 and the second lens L2, that is, combined power, largely influences the correction of aberration of the whole image pickup lens and the size of the whole image pickup lens. If a value of f1to2/f in Conditional Expression (3) is larger than the upper limit thereof, power to refract incident light rays becomes weak and the size of the whole system becomes large. Therefore, reduction in size is not achieved. If the value of f1to2/f in Conditional Expression (3) is smaller than the lower limit thereof, the combined power of the first lens L1 and the second lens L2 becomes excessively strong, which causes high-order spherical aberration, coma aberration, etc. Accordingly, optical performance is not secured. It is to be noted that, in order to improve performance by suppressing the high-order spherical aberration while further reducing the entire length, the numerical range in the above-described Conditional Expression (3) may be preferably set based on the following Conditional Expression (3)'.

$$0.45 \leq f1to2/f \leq 0.95 \quad (3)'$$

$$-1 \leq f1/f2 \leq 30 \quad (4)$$

In the above-described Conditional Expression (4), f1 is the focal length of the first lens L1, and f2 is a focal length of the second lens L2.

Conditional Expression (4) defines a relationship of the focal length of the second lens L2 with respect to the focal length of the first lens L1. Here, a ratio between the focal length of the first lens L1 and the focal length of the second lens L2, that is, allocation of power, largely influences the correction of aberration in the whole image pickup lens. If a value of f1/f2 in Conditional Expression (4) is larger than the upper limit thereof, a principal point position of the positive power group configured of the first lens L1 and the second lens L2 becomes closer to the image plane. As a result, reduction in size of the optical system is not possible. If the value of f1/f2 in Conditional Expression (4) is smaller than the lower limit thereof, the refractive power of the first lens L1 is increased more than necessary. As a result, a refractive angle of the peripheral marginal light ray that passes through the object-sided surface of the first lens L1 becomes excessively large. Accordingly, aberration is not corrected. It is to be noted that, in order to provide improved performance by more favorably correcting the aberration in accordance with an embodiment of the technology, the numerical range in the above-described Conditional Expression (4) may be preferably set based on the following Conditional Expression (4)'.

$$-0.5 \leq f1/f2 \leq 22 \quad (4)'$$

$$0 \leq f3/f4 \leq 1.0 \quad (5)$$

In the above-described Conditional Expression (5), f3 is a focal length of the third lens L3, and f4 is a focal length of the fourth lens L4.

Conditional Expression (5) defines a relationship between the focal length of the third lens L3 and the focal length of the fourth lens L4. Here, a ratio between the focal length of the third lens L3 and the focal length of the fourth lens L4 largely influences the correction of the magnification chromatic aberration and the coma aberration. If a value of f3/f4 in Conditional Expression (5) is larger than the upper limit thereof, power of the fourth lens L4 is strong, and therefore, a principal light ray in the peripheral angle of view is influenced by dispersion upon passing through the fourth lens L4. As a result, the magnification chromatic aberration becomes worse. If the value of f3/f4 in Conditional Expression (5) is smaller than the lower limit thereof, the refractive power of the third lens L3 is increased more than necessary. As a result, a refractive angle of an upper light ray becomes excessively large, and therefore, the coma aberration is not corrected. It is to be noted that, in order to improve performance by correcting the coma aberration while suppressing the magnification chromatic aberration, the numerical range in the above-described Conditional Expression (5) may be preferably set based on the following Conditional Expression (5)'.

$$0.03 \leq f3/f4 \leq 0.8 \quad (5)'$$

$$-10 \leq (R9+R10)/(R9-R10) \leq 1 \quad (6)$$

In the above-described Conditional Expression (6), R9 is a radius of curvature of an object-sided surface of the fifth lens L5, and R10 is a radius of curvature of an image-sided surface of the fifth lens L5.

Conditional Expression (6) defines a shape of the fifth lens L5. Here, a paraxial shape of the fifth lens L5 influences the correction of the spherical aberration. The fifth lens L5 may desirably have a biconvex shape or may be desirably a meniscus lens that has a convex-shaped object-sided surface, in particular. If a value of (R9+R10)/(R9−R10) in Conditional Expression (6) is larger than the upper limit thereof, refractive power for collecting light rays for determining Fno becomes weak on the object-sided surface of the fifth lens L5, and therefore, it becomes difficult to correct the spherical aberration. As a result, the aperture ratio is not allowed to be increased. If the value of (R9+R10)/(R9−R10) in Conditional Expression (6) is smaller than the lower limit thereof, power of the image-sided surface of the fifth lens L5 becomes stronger than necessary. This causes high-order aberration with respect to off-axial angle of view, which leads to degradation in optical performance. It is to be noted that, in order to prevent the high-order aberration from occurring while further suppressing the spherical aberration, the numerical range in the above-described Conditional Expression (6) may be preferably set based on the following Conditional Expression (6)'.

$$-5 \leq (R9+R10)/(R9-R10) \leq 0.75 \quad (6)'$$

$$-5 \leq (R11+R12)/(R11-R12) \leq 10 \quad (7)$$

In the above-described Conditional Expression (7), R11 is a radius of curvature of an object-sided surface of the sixth lens L6, and R12 is a radius of curvature of an image-sided surface of the sixth lens L6.

Conditional Expression (7) defines a shape of the sixth lens L6. Here, a paraxial shape of the sixth lens L6 also influences the correction of the spherical aberration. By allowing a value of (R11+R12)/(R11−R12) in Conditional Expression (7) to be in a range as defined, a marginal light ray on the entrance pupil that defines brightness of the optical system is allowed to be refracted at an angle close to a minimum angle of deviation. In particular, the on-axial light-ray group passes through a region close to a paraxial region upon passing through the fifth lens L5 and the following lenses. Therefore, by an effect resulting from moderate refraction of the on-axial light-ray group, further improved aberration correction is possible. It is to be noted that, in order to further suppress the spherical aberration, the numerical range in the above-described Conditional Expression (7) may be preferably set based on the following Conditional Expression (7)'.

$$-2.5 \leq (R11+R12)/(R11-R12) \leq 5 \quad (7)'$$

3. Example of Application to Image Pickup Unit

Figure 29:
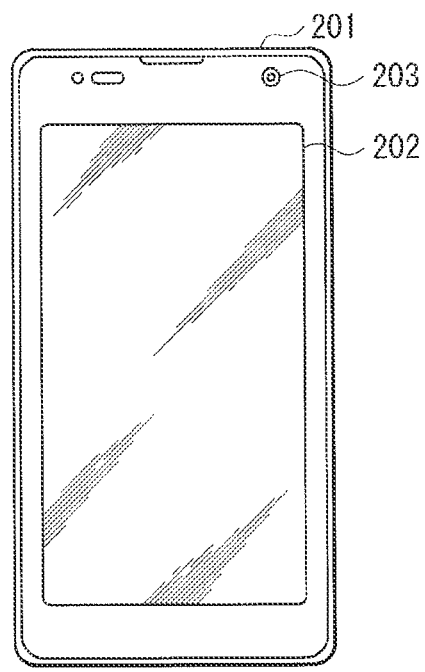
FIG. 29 is a front view illustrating a configuration example of an image pickup unit.
Figure 30:
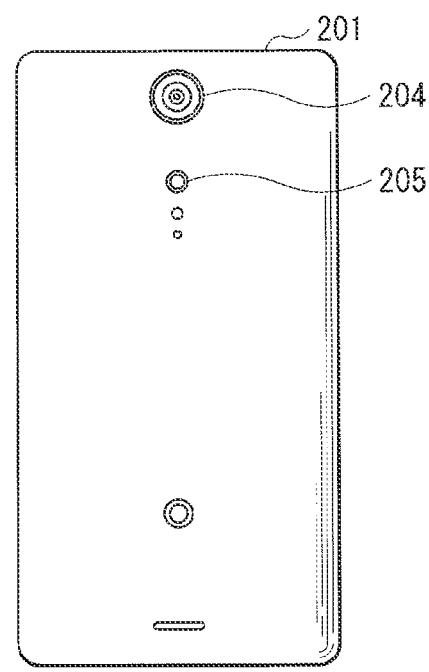
FIG. 30 is a rear view illustrating the configuration example of the image pickup unit.

FIGS. 29 and 30 illustrate a configuration example of an image pickup unit to which the image pickup lens according to the present embodiment is applied. This configuration example is an example of a personal digital assistant (PDA) (such as mobile information terminal and a mobile phone) that includes the image pickup unit. The PDA includes a substantially-rectangular housing 201. For example, a display section 202, a front camera section 203, and/or the like may be provided on the front face side of the housing 201 (FIG. 29). For example, a main camera section 204, a camera flash 205, and the like may be provided on the rear face side of the housing 201 (FIG. 30).

The display section 202 may be, for example, a touch panel that allows various kinds of operation by detecting a contact state on the surface. Thus, the display section 202 has a function of displaying various kinds of information and an input function that allows various kinds of input operation by a user. The display section 202 may display, for example, an operation state, various kinds of data such as an image taken by the front camera section 203 or the main camera section 204, and/or the like.

The image pickup lens according to the present embodiment may be applicable, for example, as a lens for a camera module in the image pickup unit (the front camera section 203 or the main camera section 204) in the PDA as shown in FIGS. 29 and 30. When the image pickup lens according to the present embodiment is used as such a lens for a camera module, an image pickup device such as a CCD (Charge Coupled Device) and a CMOS (Complementary Metal Oxide Semiconductor) that outputs an image pickup signal (image signal) based on an optical image formed by the image pickup lens is arranged near the image plane Simg of the image pickup lens. In this case, as shown in FIG. 1, for example, seal glass SG for protecting the image pickup device, an optical member such as various optical filters, and/or the like may be arranged between the sixth lens L6 and the image plane Simg as shown in FIG. 1.

It is to be noted that the image pickup lens according to the present embodiment is not limited to the above-described PDA, and is also applicable as an image pickup lens for other electronic units such as a digital still camera and a digital video camera. Moreover, the image pickup lens according to the present embodiment may be applicable to general compact image pickup units that use a solid-state image pickup device such as a CCD and a CMOS, for example, an optical sensor, a mobile module camera, a web camera, and the like.

EXAMPLES

4. Numerical Examples of Lenses

Next, specific numerical examples of the image pickup lens according to the present embodiment will be described. Symbols etc. in the tables and the description below represent the following. "Si" represents the number of an i-th surface where a surface of a most-object-sided component is counted as a 1st surface and numerals are sequentially attached to surfaces of the components so that the numeral becomes larger as the surface of the component become closer to the image plane. "Ri" represents a value (mm) of a paraxial radius of curvature of the i-th surface. "Di" represents a value (mm) of a spacing on the optical axis between the i-th surface and the (i+1)th surface. "Ni" represents a value of a refractive index of the d line (having a wavelength of 587.6 nm) of a material of an optical component that has the i-th surface. "vi" represents a value of an Abbe number of the d line of the material of the optical component that has the i-th surface. Concerning the surface number, "ASP" indicates that the relevant surface is an aspherical surface. Concerning the radius of curvature, "∞" indicates that the relevant surface is a planar surface or an aperture stop surface. ω represents a half angle of view, and Fno represents F-number.

In each example, a shape of the aspherical surface is represented by the following expression. In data of aspherical surface coefficients, a symbol "E" indicates that a numerical value following the symbol "E" is an "exponent of a power" having 10 as a base, and that a numerical value represented by an exponential function of 10 as a base is to be multiplied by a numerical value before "E". To give an example, "1.0E-05" represents "$1.0 \times 10^{-5}$".

[Expression of Aspherical Surface]

The shape of the aspherical surface is represented by the following numerical expression where a vertex of the surface is set as the origin, an X axis is set along the optical axis, and a height in a direction perpendicular to the optical axis Z1 is represented by h, $$X = (h^2/R)/[1+\{1-(1+K)(h^2/R^2)\}^{1/2}] + \Sigma A_i \cdot h^i$$

where R is a paraxial radius of curvature, K is a conic constant, and Ai is an ith-order aspherical coefficient (i is an integer of 3 or larger).

[Configuration Common to Respective Numerical Examples]

Any of image pickup lenses according to the numerical examples below has a configuration that satisfies the above-described basic configuration of the lenses. Each of the image pickup lenses according to the respective numerical examples includes a plurality of aspherical surfaces. The seal glass SG is arranged between the sixth lens L6 and the image plane Simg.

Numerical Example 1

[Table 1] and [Table 2] each show specific lens data corresponding to the image pickup lens according to the first configuration example shown in FIG. 1. In particular, [Table 1] shows basic lens data thereof, and [Table 2] shows data related to the aspherical surfaces. [Table 1] also shows values of Fno, the angle of view 2ω, and a focal length f of the whole system.

In this first configuration example, the second lens L2 has positive refractive power. The aperture stop St is arranged on the object plane side of the first lens L1. Further, all of the first lens L1 to the sixth lens L6 are formed of resin materials. Further, the third lens L3 is formed of a material same as that of the fourth lens L4. The second and third surfaces are spherical and other surfaces are aspherical in the first lens L1 to the sixth lens L6.

TABLE 1

| Fno | 2.2 |
| f | 3.708 |
| 2ω | 76.18° |

| Example 1 • lens data | | | | |
|---|---|---|---|---|
| Si | Ri | Di | Ni | vi |
| (aperture) | ∞ | | | |
| 1(ASP) | 1.531 | 0.334 | 1.5346 | 56.27 |
| 2 | 3.709 | 0.100 | | |
| 3 | 7.536 | 0.360 | 1.5346 | 56.27 |
| 4(ASP) | -9.351 | 0.134 | | |
| 5(ASP) | -9.705 | 0.355 | 1.6349 | 23.89 |
| 6(ASP) | 7.046 | 0.400 | | |
| 7(ASP) | 14.839 | 0.400 | 1.6349 | 23.89 |
| 8(ASP) | 5.138 | 0.220 | | |
| 9(ASP) | 3.328 | 0.533 | 1.5346 | 56.27 |
| 10(ASP) | -2.220 | 0.488 | | |
| 11(ASP) | -3.528 | 0.410 | 1.5346 | 56.27 |
| 12(ASP) | 2.029 | 0.210 | | |
| 13 | ∞ | 0.100 | 1.5168 | 64.19 |
| 14 | ∞ | 0.469 | | |

TABLE 2

Example 1. aspherical surface data

| coefficient | surface number | | | | | |
|---|---|---|---|---|---|---|
| | 1 | 2 | 3 | 4 | 5 | 6 |
| K | 3.16839E−01 | 0.00000E+00 | 0.00000E+00 | 0.00000E+00 | 1.30140E+01 | 0.00000E+00 |
| A3 | 0.00000E+00 | 0.00000E+00 | 0.00000E+00 | 0.00000E+00 | 1.77935E−02 | 2.29128E−02 |
| A4 | −1.96032E−02 | 0.00000E+00 | 0.00000E+00 | −6.08055E−03 | −4.26499E−02 | −2.66675E−02 |
| A5 | 0.00000E+00 | 0.00000E+00 | 0.00000E+00 | 0.00000E+00 | −1.21022E−01 | 5.72215E−03 |
| A6 | 1.73124E−02 | 0.00000E+00 | 0.00000E+00 | −5.58489E−02 | 7.02528E−01 | 3.42813E−02 |
| A7 | 0.00000E+00 | 0.00000E+00 | 0.00000E+00 | 0.00000E+00 | −1.54637E+00 | 5.20910E−02 |
| A8 | −1.00213E−01 | 0.00000E+00 | 0.00000E+00 | −8.06192E−02 | 1.34423E+00 | −1.22550E−02 |
| A9 | 0.00000E+00 | 0.00000E+00 | 0.00000E+00 | 0.00000E+00 | −5.09146E−01 | −2.33072E−01 |
| A10 | 1.30680E−01 | 0.00000E+00 | 0.00000E+00 | 8.94223E−02 | 1.05387E−01 | 2.09899E−01 |
| A11 | 0.00000E+00 | 0.00000E+00 | 0.00000E+00 | 0.00000E+00 | 0.00000E+00 | 0.00000E+00 |
| A12 | −9.28132E−02 | 0.00000E+00 | 0.00000E+00 | −4.21942E−02 | 0.00000E+00 | 0.00000E+00 |
| coefficient | 7 | 8 | 9 | 10 | 11 | 12 |
| K | 2.37460E+01 | 0.00000E+00 | 0.00000E+00 | 0.00000E+00 | −6.89277E−01 | −7.26036E+01 |
| A3 | −1.13057E−02 | −2.25512E−02 | −4.04801E−02 | −4.12267E−02 | −1.80480E−01 | 2.11306E−01 |
| A4 | −9.50721E−02 | −2.44682E−01 | −6.95076E−02 | 1.44475E−01 | 9.71981E−02 | −3.58989E−01 |
| A5 | −7.42136E−02 | 1.34087E−01 | 5.85340E−02 | 1.47376E−02 | 4.45443E−03 | 2.22830E−01 |
| A6 | 1.58359E−01 | −2.51950E−02 | −5.50717E−02 | −3.04612E−02 | 1.65896E−03 | −5.03009E−02 |
| A7 | 1.04369E−01 | −8.90434E−03 | 2.23923E−03 | −5.56214E−03 | −1.43203E−03 | −6.26272E−03 |
| A8 | −3.18413E−01 | 2.88665E−02 | 1.18396E−02 | 7.25520E−04 | −4.41256E−04 | 3.08856E−03 |
| A9 | 2.16049E−01 | 7.37149E−03 | 1.06772E−02 | 1.57601E−03 | −3.62954E−05 | 3.77928E−04 |
| A10 | −5.69763E−02 | −1.21255E−02 | −5.10060E−03 | 7.89481E−04 | −2.19269E−05 | −1.54655E−04 |
| A11 | 0.00000E+00 | 0.00000E+00 | −3.34381E−03 | −6.95023E−06 | 0.00000E+00 | 0.00000E+00 |
| A12 | 0.00000E+00 | 0.00000E+00 | 1.36607E−03 | −1.89818E−04 | 0.00000E+00 | 0.00000E+00 |

Numerical Example 2

Figure 2:
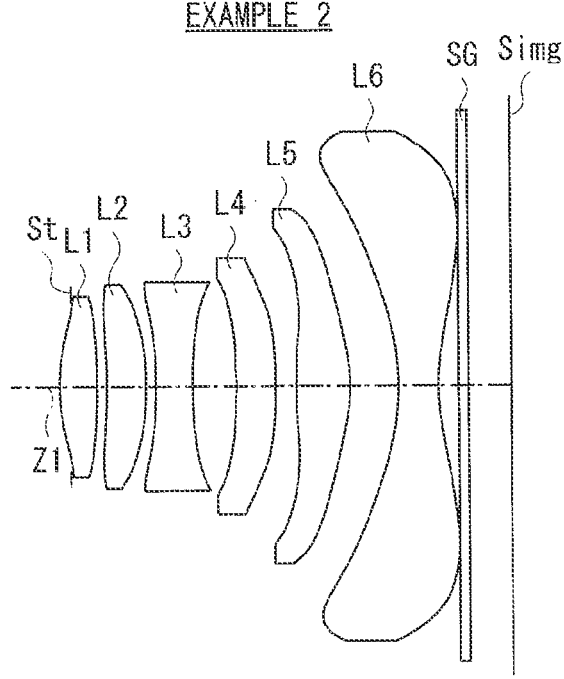
FIG. 2 illustrates a second configuration example of the image pickup lens and is a lens cross-sectional view corresponding to Numerical Example 2.

[Table 3] and [Table 4] each show specific lens data corresponding to the image pickup lens according to the second configuration example shown in FIG. 2. In particular, [Table 3] shows basic lens data thereof, and [Table 4] shows data related to the aspherical surfaces. [Table 3] also shows values of Fno, the angle of view 2ω, and the focal length f of the whole system.

In this second configuration example, the second lens L2 has positive refractive power. The aperture stop St is arranged on the object plane side of the first lens L1. Further, all of the first lens L1 to the sixth lens L6 are formed of resin materials. Further, the third lens L3 is formed of a material same as that of the fourth lens L4. All of the surfaces in the first lens L1 to the sixth lens L6 are aspherical.

TABLE 3

| Fno | 2.2 |
|---|---|
| f | 3.707 |
| 2ω | 76.18° |

TABLE 3-continued

Example 2 • lens data

| Si | Ri | Di | Ni | vi |
|---|---|---|---|---|
| (aperture) | ∞ | | | |
| 1(ASP) | 2.008 | 0.382 | 1.5346 | 56.27 |
| 2(ASP) | −6.181 | 0.100 | | |
| 3(ASP) | −4.754 | 0.400 | 1.5346 | 56.27 |
| 4(ASP) | −2.681 | 0.100 | | |
| 5(ASP) | −4.876 | 0.375 | 1.6349 | 23.89 |
| 6(ASP) | 4.659 | 0.440 | | |
| 7(ASP) | −6.623 | 0.400 | 1.6349 | 23.89 |
| 8(ASP) | −8.406 | 0.220 | | |
| 9(ASP) | 5.792 | 0.533 | 1.5346 | 56.27 |
| 10(ASP) | −2.070 | 0.488 | | |
| 11(ASP) | −3.589 | 0.410 | 1.5346 | 56.27 |
| 12(ASP) | 1.997 | 0.210 | | |
| 13 | ∞ | 0.100 | 1.5168 | 64.19 |
| 14 | ∞ | 0.465 | | |

TABLE 4

Example 2. aspherical surface data

| coefficient | surface number | | | | | |
|---|---|---|---|---|---|---|
| | 1 | 2 | 3 | 4 | 5 | 6 |
| K | 3.16839E−01 | 0.00000E+00 | 0.00000E+00 | 0.00000E+00 | 1.30140E+01 | 0.00000E+00 |
| A3 | 0.00000E+00 | 0.00000E+00 | 0.00000E+00 | 0.00000E+00 | 1.31941E−02 | −2.29824E−02 |
| A4 | −5.68952E−02 | −7.73235E−04 | 9.26736E−02 | 3.32155E−02 | −3.17316E−02 | 7.27525E−02 |
| A5 | 0.00000E+00 | 0.00000E+00 | 0.00000E+00 | 0.00000E+00 | −1.37990E−01 | −5.78527E−02 |
| A6 | −4.08620E−02 | 1.12450E−03 | 9.84980E−03 | −9.00402E−02 | 7.14046E−01 | −2.91140E−02 |
| A7 | 0.00000E+00 | 0.00000E+00 | 0.00000E+00 | 0.00000E+00 | −1.49221E+00 | 8.23695E−02 |
| A8 | −4.77107E−02 | −3.43040E−02 | 2.39250E−02 | 2.05203E−02 | 1.40117E+00 | 7.78482E−02 |
| A9 | 0.00000E+00 | 0.00000E+00 | 0.00000E+00 | 0.00000E+00 | −4.96490E−01 | −1.85714E−01 |

TABLE 4-continued

Example 2. aspherical surface data

| A10 | −1.14829E−02 | 1.04240E−02 | −3.48544E−02 | 1.05044E−02 | 4.43978E−02 | 9.95682E−02 |
| A11 | 0.00000E+00 | 0.00000E+00 | 0.00000E+00 | 0.00000E+00 | 0.00000E+00 | 0.00000E+00 |
| A12 | 9.18440E−03 | 0.00000E+00 | 0.00000E+00 | −7.41817E−03 | 0.00000E+00 | 0.00000E+00 |

| coefficient | 7 | 8 | 9 | 10 | 11 | 12 |
| --- | --- | --- | --- | --- | --- | --- |
| K | 2.37460E+01 | 0.00000E+00 | 0.00000E+00 | 0.00000E+00 | −6.89277E−01 | −7.26036E+01 |
| A3 | 8.37982E−03 | 1.52895E−02 | −1.71474E−02 | −2.74177E−02 | −1.27310E−01 | 2.85756E−01 |
| A4 | −3.94729E−02 | −1.99024E−01 | −8.41826E−02 | 1.44471E−01 | 9.79963E−02 | −4.38892E−01 |
| A5 | −7.50992E−02 | 9.65920E−02 | 4.53809E−02 | 2.48640E−03 | −3.96502E−03 | 2.77541E−01 |
| A6 | 9.14019E−02 | −5.15766E−02 | −5.67982E−02 | −3.61213E−02 | −3.01084E−03 | −8.17585E−02 |
| A7 | 7.45154E−02 | −9.93932E−03 | 6.35171E−03 | −5.45491E−03 | −2.85269E−03 | 4.62904E−03 |
| A8 | −2.76957E−01 | 3.86660E−02 | 1.47237E−02 | 2.21011E−03 | −5.89552E−04 | 2.45047E−03 |
| A9 | 2.61600E−01 | 1.52792E−02 | 1.15973E−02 | 2.46892E−03 | 1.36747E−04 | −2.31056E−04 |
| A10 | −8.73102E−02 | −1.38893E−02 | −5.15436E−03 | 9.77596E−04 | 1.67369E−04 | −6.88041E−05 |
| A11 | 0.00000E+00 | 0.00000E+00 | −3.70683E−03 | −1.00595E−04 | 0.00000E+00 | 0.00000E+00 |
| A12 | 0.00000E+00 | 0.00000E+00 | 9.83753E−04 | −3.18249E−04 | 0.00000E+00 | 0.00000E+00 |

Numerical Example 3

Figure 3:
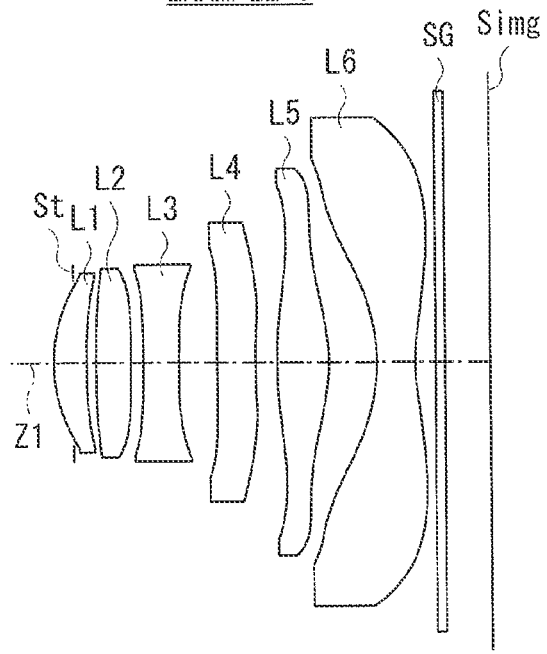
FIG. 3 illustrates a third configuration example of the image pickup lens and is a lens cross-sectional view corresponding to Numerical Example 3.

[Table 5] and [Table 6] each show specific lens data corresponding to the image pickup lens according to the third configuration example shown in FIG. 3. In particular, [Table 5] shows basic lens data thereof, and [Table 6] shows data related to the aspherical surfaces. [Table 5] also shows values of Fno, the angle of view 2ω, and the focal length f of the whole system.

In this third configuration example, the second lens L2 has positive refractive power. The aperture stop St is arranged on the object plane side of the first lens L1. Further, all of the first lens L1 to the sixth lens L6 are formed of resin materials. Further, the third lens L3 is formed of a material same as that of the fourth lens L4. The second and third surfaces are spherical and other surfaces are aspherical in the first lens L1 to the sixth lens L6.

TABLE 5

| Fno | 2.2 |
| f | 3.707 |
| 2ω | 76.18° |

TABLE 5-continued

Example 3 • lens data

| Si | Ri | Di | Ni | vi |
| --- | --- | --- | --- | --- |
| (aperture) | ∞ | | | |
| 1(ASP) | 1.567 | 0.334 | 1.5346 | 56.27 |
| 2 | 4.576 | 0.100 | | |
| 3 | 8.009 | 0.360 | 1.5346 | 56.27 |
| 4(ASP) | −12.740 | 0.134 | | |
| 5(ASP) | −17.909 | 0.355 | 1.6349 | 23.89 |
| 6(ASP) | 4.666 | 0.400 | | |
| 7(ASP) | 10.252 | 0.400 | 1.6349 | 23.89 |
| 8(ASP) | 4.552 | 0.220 | | |
| 9(ASP) | 3.193 | 0.533 | 1.5346 | 56.27 |
| 10(ASP) | −2.157 | 0.488 | | |
| 11(ASP) | −3.233 | 0.410 | 1.5346 | 56.27 |
| 12(ASP) | 2.100 | 0.210 | | |
| 13 | ∞ | 0.100 | 1.5168 | 64.19 |
| 14 | ∞ | 0.455 | | |

TABLE 6

Example 3. aspherical surface data surface number

| coefficient | 1 | 2 | 3 | 4 | 5 | 6 |
| --- | --- | --- | --- | --- | --- | --- |
| K | 3.16839E−01 | 0.00000E+00 | 0.00000E+00 | 0.00000E+00 | 1.30140E+01 | 0.00000E+00 |
| A3 | 0.00000E+00 | 0.00000E+00 | 0.00000E+00 | 0.00000E+00 | 1.67935E−02 | 6.50591E−03 |
| A4 | −1.85038E−02 | 0.00000E+00 | 0.00000E+00 | −2.94365E−02 | −8.35766E−02 | −1.16122E−02 |
| A5 | 0.00000E+00 | 0.00000E+00 | 0.00000E+00 | 0.00000E+00 | −1.23588E−01 | −1.74826E−02 |
| A6 | 2.04586E−02 | 0.00000E+00 | 0.00000E+00 | −3.43413E−02 | 7.23961E−01 | 2.47644E−02 |
| A7 | 0.00000E+00 | 0.00000E+00 | 0.00000E+00 | 0.00000E+00 | −1.52473E+00 | 7.07488E−02 |
| A8 | −9.99404E−02 | 0.00000E+00 | 0.00000E+00 | −7.82575E−02 | 1.35182E+00 | 1.53671E−02 |
| A9 | 0.00000E+00 | 0.00000E+00 | 0.00000E+00 | 0.00000E+00 | −5.16077E−01 | −2.26736E−01 |
| A10 | 1.27716E−01 | 0.00000E+00 | 0.00000E+00 | 8.71710E−02 | 7.92295E−02 | 1.75149E−01 |
| A11 | 0.00000E+00 | 0.00000E+00 | 0.00000E+00 | 0.00000E+00 | 0.00000E+00 | 0.00000E+00 |
| A12 | −8.54374E−02 | 0.00000E+00 | 0.00000E+00 | −4.59363E−02 | 0.00000E+00 | 0.00000E+00 |

| coefficient | 7 | 8 | 9 | 10 | 11 | 12 |
| --- | --- | --- | --- | --- | --- | --- |
| K | 2.37460E+01 | 0.00000E+00 | 0.00000E+00 | 0.00000E+00 | −6.89277E−01 | −7.26036E+01 |
| A3 | 3.62455E−04 | −7.17771E−03 | −3.34741E−02 | −4.01035E−02 | −1.90884E−01 | 1.83240E−01 |
| A4 | −1.14859E−01 | −2.42079E−01 | −5.18223E−02 | 1.42989E−01 | 8.46493E−02 | −3.43440E−01 |
| A5 | −7.01387E−02 | 1.17782E−01 | 5.40343E−02 | 1.74519E−02 | 9.44565E−03 | 2.21386E−01 |
| A6 | 1.59182E−01 | −2.93887E−02 | −5.95705E−02 | −2.69365E−02 | 5.75352E−03 | −5.19348E−02 |

TABLE 6-continued

Example 3. aspherical surface data

| | | | | | | |
|---|---|---|---|---|---|---|
| A7  | 1.05441E−01  | −5.98547E−03 | 1.48315E−03  | −4.21555E−03 | −5.06084E−04 | −5.53828E−03 |
| A8  | −3.14000E−01 | 3.20272E−02  | 1.21028E−02  | 5.83557E−04  | −6.45521E−04 | 2.95838E−03  |
| A9  | 2.19676E−01  | 8.45865E−03  | 1.09210E−02  | 1.11056E−03  | −2.63195E−04 | 3.03893E−04  |
| A10 | −6.05032E−02 | −1.31169E−02 | −5.00830E−03 | 5.22803E−04  | −1.00318E−04 | −1.41665E−04 |
| A11 | 0.00000E+00  | 0.00000E+00  | −3.33923E−03 | −3.64735E−05 | 0.00000E+00  | 0.00000E+00  |
| A12 | 0.00000E+00  | 0.00000E+00  | 1.34052E−03  | −1.04531E−04 | 0.00000E+00  | 0.00000E+00  |

Numerical Example 4

Figure 4:
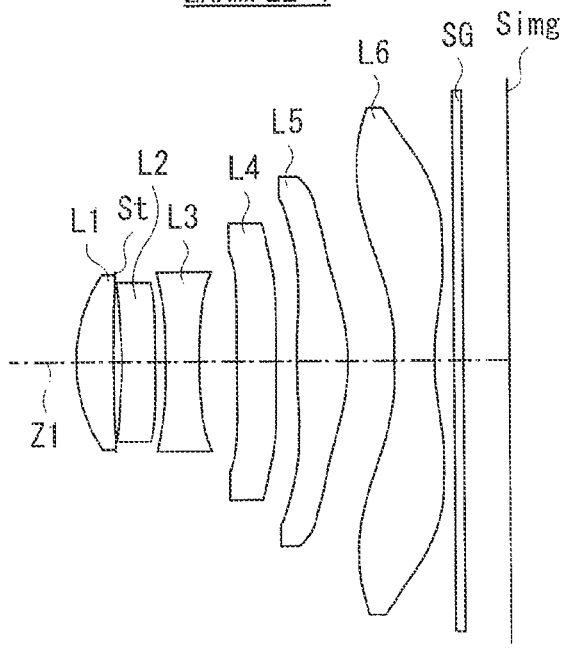
FIG. 4 illustrates a fourth configuration example of the image pickup lens and is a lens cross-sectional view corresponding to Numerical Example 4.

[Table 7] and [Table 8] each show specific lens data corresponding to the image pickup lens according to the fourth configuration example shown in FIG. 4. In particular, [Table 7] shows basic lens data thereof, and [Table 8] shows data related to the aspherical surfaces. [Table 7] also shows values of Fno, the angle of view 2ω, and the focal length f of the whole system.

In this fourth configuration example, the second lens L2 has negative refractive power. The aperture stop St is arranged between the first lens L1 and the second lens L2. Further, only the first lens L1 in the first lens L1 to the sixth lens L6 is formed of a glass material. Further, the third lens L3 is formed of a material same as that of the fourth lens L4. The first and second surfaces are spherical and other surfaces are aspherical in the first lens L1 to the sixth lens L6.

TABLE 7

| Fno | 2.2 |
|---|---|
| f | 3.707 |
| 2ω | 76.18° |

TABLE 7-continued

Example 4 • lens data

| Si | Ri | Di | Ni | vi |
|---|---|---|---|---|
| 1        | 1.753    | 0.391 | 1.7292 | 54.67 |
| 2        | 25.723   | 0.020 |        |       |
| (aperture) | ∞      | 0.060 |        |       |
| 3(ASP)   | −4.742   | 0.360 | 1.5346 | 56.27 |
| 4(ASP)   | −9.827   | 0.100 |        |       |
| 5(ASP)   | −10.601  | 0.355 | 1.6349 | 23.89 |
| 6(ASP)   | 5.483    | 0.400 |        |       |
| 7(ASP)   | 20.281   | 0.400 | 1.6349 | 23.89 |
| 8(ASP)   | 7.842    | 0.220 |        |       |
| 9(ASP)   | 7.355    | 0.533 | 1.5346 | 56.27 |
| 10(ASP)  | −2.035   | 0.488 |        |       |
| 11(ASP)  | −10.366  | 0.410 | 1.5346 | 56.27 |
| 12(ASP)  | 2.000    | 0.210 |        |       |
| 13       | ∞        | 0.100 | 1.5168 | 64.19 |
| 14       | ∞        | 0.477 |        |       |

TABLE 8

Example 4. aspherical surface data surface number

| coefficient | 1 | 2 | 3 | 4 | 5 | 6 |
|---|---|---|---|---|---|---|
| K   | 0.00000E+00 | 0.00000E+00 | 0.00000E+00  | 0.00000E+00  | 1.30140E+01  | 0.00000E+00  |
| A3  | 0.00000E+00 | 0.00000E+00 | 0.00000E+00  | 0.00000E+00  | 3.58061E−02  | 9.35810E−03  |
| A4  | 0.00000E+00 | 0.00000E+00 | 7.79480E−02  | 8.77678E−02  | −8.02881E−02 | 2.38979E−03  |
| A5  | 0.00000E+00 | 0.00000E+00 | 0.00000E+00  | 0.00000E+00  | −1.34255E−01 | 2.82698E−02  |
| A6  | 0.00000E+00 | 0.00000E+00 | −3.77850E−02 | −2.13554E−01 | 7.12303E−01  | −2.46342E−02 |
| A7  | 0.00000E+00 | 0.00000E+00 | 0.00000E+00  | 0.00000E+00  | −1.54372E+00 | −4.77219E−03 |
| A8  | 0.00000E+00 | 0.00000E+00 | −1.17689E−02 | 7.48617E−02  | 1.24896E+00  | 6.28359E−02  |
| A9  | 0.00000E+00 | 0.00000E+00 | 0.00000E+00  | 0.00000E+00  | −4.50370E−01 | −8.88808E−02 |
| A10 | 0.00000E+00 | 0.00000E+00 | 9.03224E−03  | −9.97996E−02 | 1.67867E−01  | 7.97601E−02  |
| A11 | 0.00000E+00 | 0.00000E+00 | 0.00000E+00  | 0.00000E+00  | 0.00000E+00  | 0.00000E+00  |
| A12 | 0.00000E+00 | 0.00000E+00 | 0.00000E+00  | 1.28218E−01  | 0.00000E+00  | 0.00000E+00  |

| coefficient | 7 | 8 | 9 | 10 | 11 | 12 |
|---|---|---|---|---|---|---|
| K   | 2.37460E+01  | 0.00000E+00  | 0.00000E+00  | 0.00000E+00  | −6.89277E−01 | −7.26036E+01 |
| A3  | −2.23484E−02 | −1.70804E−02 | −3.18290E−02 | −5.83969E−02 | −2.17538E−01 | 2.21088E−01  |
| A4  | −2.25735E−02 | −1.39960E−01 | −1.71876E−02 | 1.71229E−01  | 1.05269E−01  | −4.34577E−01 |
| A5  | −9.11016E−02 | 8.52358E−02  | 5.00797E−02  | −9.32160E−02 | 7.70580E−03  | 2.94851E−01  |
| A6  | 1.17035E−01  | −6.60252E−02 | −7.96515E−02 | −2.98684E−02 | −3.02378E−02 | −7.16751E−02 |
| A7  | 6.97860E−02  | −4.45850E−03 | −6.28448E−03 | −3.76838E−04 | −1.81170E−03 | −1.04597E−02 |
| A8  | −2.79319E−01 | 4.34865E−02  | 1.44384E−02  | 2.59425E−03  | −4.38299E−05 | 4.93400E−03  |
| A9  | 2.68061E−01  | 1.00852E−02  | 1.50789E−02  | 1.34832E−03  | 7.99037E−05  | 8.03016E−04  |
| A10 | −9.82551E−02 | −1.46625E−02 | −2.51534E−03 | 1.62483E−04  | 1.17720E−05  | −2.78185E−04 |
| A11 | 0.00000E+00  | 0.00000E+00  | −3.02634E−03 | −2.62157E−04 | 0.00000E+00  | 0.00000E+00  |
| A12 | 0.00000E+00  | 0.00000E+00  | 2.81960E−04  | 1.01800E−05  | 0.00000E+00  | 0.00000E+00  |

Numerical Example 5

Figure 5:
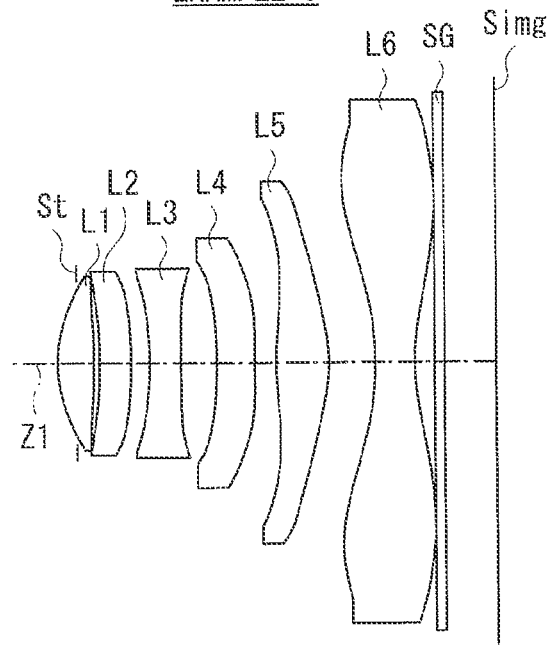
FIG. 5 illustrates a fifth configuration example of the image pickup lens and is a lens cross-sectional view corresponding to Numerical Example 5.

[Table 9] and [Table 10] each show specific lens data corresponding to the image pickup lens according to the fifth configuration example shown in FIG. 5. In particular, [Table 9] shows basic lens data thereof, and [Table 10] shows data related to the aspherical surfaces. [Table 9] also shows values of Fno, the angle of view 2ω, and the focal length f of the whole system.

In this fifth configuration example, the second lens L2 has negative refractive power. The aperture stop St is arranged on the object plane side of the first lens L1. Further, all of the first lens L1 to the sixth lens L6 are formed of resin materials. Further, the third lens L3 is formed of a material same as that of the fourth lens L4. The second and third surfaces are spherical and other surfaces are aspherical in the first lens L1 to the sixth lens L6.

TABLE 9

| Fno | 2.2 |
| --- | --- |
| f | 3.706 |
| 2ω | 76.2° |

Example 5 • lens data

| Si | Ri | Di | Ni | vi |
| --- | --- | --- | --- | --- |
| (aperture) | ∞ | | | |
| 1(ASP) | 1.549 | 0.362 | 1.5346 | 56.27 |
| 2 | −14.091 | 0.068 | | |
| 3 | −4.787 | 0.320 | 1.5346 | 56.27 |
| 4(ASP) | −7.059 | 0.197 | | |
| 5(ASP) | −4.058 | 0.325 | 1.6349 | 23.89 |
| 6(ASP) | 114.828 | 0.372 | | |
| 7(ASP) | −5.338 | 0.400 | 1.6349 | 23.89 |
| 8(ASP) | −14.150 | 0.220 | | |
| 9(ASP) | 4.292 | 0.533 | 1.5346 | 56.27 |
| 10(ASP) | −2.154 | 0.488 | | |
| 11(ASP) | −4.654 | 0.410 | 1.5346 | 56.27 |
| 12(ASP) | 2.079 | 0.210 | | |
| 13 | ∞ | 0.100 | 1.5168 | 64.19 |
| 14 | ∞ | 0.539 | | |

TABLE 10

Example 5. aspherical surface data

| coefficient | 1 | 2 | 3 | 4 | 5 | 6 |
| --- | --- | --- | --- | --- | --- | --- |
| K | 3.16839E−01 | 0.00000E+00 | 0.00000E+00 | 0.00000E+00 | 1.30140E+01 | 0.00000E+00 |
| A3 | 0.00000E+00 | 0.00000E+00 | 0.00000E+00 | 0.00000E+00 | 3.41011E−03 | −2.51621E−03 |
| A4 | −1.89575E−02 | 0.00000E+00 | 0.00000E+00 | −7.99584E−02 | −6.24877E−03 | 5.94276E−02 |
| A5 | 0.00000E+00 | 0.00000E+00 | 0.00000E+00 | 0.00000E+00 | −1.94269E−01 | 8.43513E−02 |
| A6 | 4.13503E−02 | 0.00000E+00 | 0.00000E+00 | 2.58161E−02 | 7.22760E−01 | −4.05439E−03 |
| A7 | 0.00000E+00 | 0.00000E+00 | 0.00000E+00 | 0.00000E+00 | −1.37208E+00 | 2.80757E−02 |
| A8 | −1.79564E−01 | 0.00000E+00 | 0.00000E+00 | −1.27733E−01 | 1.38845E+00 | 3.23340E−02 |
| A9 | 0.00000E+00 | 0.00000E+00 | 0.00000E+00 | 0.00000E+00 | −5.69225E−01 | −1.29356E−01 |
| A10 | 2.63741E−01 | 0.00000E+00 | 0.00000E+00 | 1.98534E−01 | 4.17275E−02 | 1.06112E−01 |
| A11 | 0.00000E+00 | 0.00000E+00 | 0.00000E+00 | 0.00000E+00 | 0.00000E+00 | 0.00000E+00 |
| A12 | −1.78089E−01 | 0.00000E+00 | 0.00000E+00 | −1.39431E−01 | 0.00000E+00 | 0.00000E+00 |

| coefficient | 7 | 8 | 9 | 10 | 11 | 12 |
| --- | --- | --- | --- | --- | --- | --- |
| K | 2.37460E+01 | 0.00000E+00 | 0.00000E+00 | 0.00000E+00 | −6.89277E−01 | −7.26036E+01 |
| A3 | 3.96524E−03 | 3.91247E−03 | −2.32041E−02 | −4.46020E−02 | −1.13167E−01 | 3.11514E−01 |
| A4 | −3.69990E−02 | −2.13266E−01 | −1.22432E−01 | 1.61603E−01 | 5.92034E−02 | −4.89154E−01 |
| A5 | −3.39370E−02 | 1.44862E−01 | 1.20907E−01 | −9.10992E−03 | 8.74854E−03 | 2.93909E−01 |
| A6 | 9.93580E−02 | −4.02314E−02 | −6.52192E−02 | −3.71443E−02 | −4.73814E−04 | −6.06625E−02 |
| A7 | 5.76141E−02 | −2.71531E−02 | −1.39564E−02 | −3.71645E−02 | −1.27339E−01 | −1.15245E−02 |
| A8 | −2.92890E−01 | 2.51797E−02 | 8.52180E−03 | 3.98600E−03 | −1.60953E−04 | 4.24793E−03 |
| A9 | 2.50461E−01 | 1.12600E−02 | 1.32291E−02 | 2.56531E−03 | 2.45139E−06 | 9.57385E−04 |
| A10 | −7.09019E−02 | −8.83759E−03 | −2.35691E−03 | 7.06439E−04 | 1.75406E−05 | −3.06324E−04 |
| A11 | 0.00000E+00 | 0.00000E+00 | −2.60038E−03 | −2.26071E−04 | 0.00000E+00 | 0.00000E+00 |
| A12 | 0.00000E+00 | 0.00000E+00 | 4.74980E−04 | −2.37064E−04 | 0.00000E+00 | 0.00000E+00 |

Numerical Example 6

Figure 6:
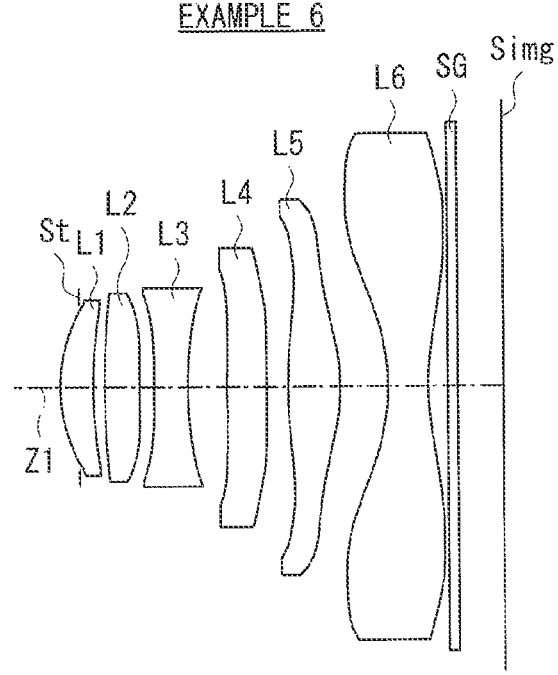
FIG. 6 illustrates a sixth configuration example of the image pickup lens and is a lens cross-sectional view corresponding to Numerical Example 6.

[Table 11] and [Table 12] each show specific lens data corresponding to the image pickup lens according to the sixth configuration example shown in FIG. 6. In particular, [Table 11] shows basic lens data thereof, and [Table 12] shows data related to the aspherical surfaces. [Table 11] also shows values of Fno, the angle of view 2ω, and the focal length f of the whole system.

In this sixth configuration example, the second lens L2 has positive refractive power. The aperture stop St is arranged on the object plane side of the first lens L1. Further, all of the first lens L1 to the sixth lens L6 are formed of resin materials. Further, the third lens L3 is formed of a material same as that of the fourth lens L4. The second and third surfaces are spherical and other surfaces are aspherical in the first lens L1 to the sixth lens L6.

TABLE 11

| Fno | 2.2 |
| --- | --- |
| f | 3.707 |
| 2ω | 76.18° |

Example 6 • lens data

| Si | Ri | Di | Ni | vi |
| --- | --- | --- | --- | --- |
| (aperture) | ∞ | | | |
| 1(ASP) | 1.610 | 0.342 | 1.5346 | 56.27 |
| 2 | 5.031 | 0.120 | | |
| 3 | 10.993 | 0.360 | 1.5346 | 56.27 |
| 4(ASP) | −12.516 | 0.134 | | |
| 5(ASP) | −169.966 | 0.355 | 1.6349 | 23.89 |

TABLE 11-continued

| | | | | |
|---|---|---|---|---|
| 6(ASP) | 3.772 | 0.400 | | |
| 7(ASP) | 12.093 | 0.400 | 1.6349 | 23.89 |
| 8(ASP) | 6.045 | 0.220 | | |
| 9(ASP) | 3.363 | 0.533 | 1.5346 | 56.27 |
| 10(ASP) | −2.100 | 0.488 | | |
| 11(ASP) | −3.288 | 0.410 | 1.5346 | 56.27 |
| 12(ASP) | 2.121 | 0.210 | | |
| 13 | ∞ | 0.100 | 1.5168 | 64.19 |
| 14 | ∞ | 0.487 | | |

TABLE 12

Example 6. aspherical surface data

| coefficient | surface number | | | | | |
|---|---|---|---|---|---|---|
| | 1 | 2 | 3 | 4 | 5 | 6 |
| K | 3.16839E−01 | 0.00000E+00 | 0.00000E+00 | 0.00000E+00 | 1.30140E+01 | 0.00000E+00 |
| A3 | 0.00000E+00 | 0.00000E+00 | 0.00000E+00 | 0.00000E+00 | 2.01320E−02 | −1.05266E−02 |
| A4 | −1.87195E−02 | 0.00000E+00 | 0.00000E+00 | −7.39562E−02 | −1.70256E−01 | −2.10485E−02 |
| A5 | 0.00000E+00 | 0.00000E+00 | 0.00000E+00 | 0.00000E+00 | −1.22442E−01 | −3.95751E−02 |
| A6 | 1.66215E−02 | 0.00000E+00 | 0.00000E+00 | −2.44559E−03 | 7.69139E−01 | 1.55226E−02 |
| A7 | 0.00000E+00 | 0.00000E+00 | 0.00000E+00 | 0.00000E+00 | −1.49805E+00 | 9.30648E−02 |
| A8 | −9.00208E−02 | 0.00000E+00 | 0.00000E+00 | −6.95832E−02 | 1.35601E+00 | 4.53559E−02 |
| A9 | 0.00000E+00 | 0.00000E+00 | 0.00000E+00 | 0.00000E+00 | −5.21483E−01 | −2.22310E−01 |
| A10 | 1.14102E−01 | 0.00000E+00 | 0.00000E+00 | 7.59247E−02 | 5.96035E−02 | 1.41687E−01 |
| A11 | 0.00000E+00 | 0.00000E+00 | 0.00000E+00 | 0.00000E+00 | 0.00000E+00 | 0.00000E+00 |
| A12 | −7.75791E−02 | 0.00000E+00 | 0.00000E+00 | −4.46500E−02 | 0.00000E+00 | 0.00000E+00 |
| coefficient | 7 | 8 | 9 | 10 | 11 | 12 |
| K | 2.37460E+01 | 0.00000E+00 | 0.00000E+00 | 0.00000E+00 | −6.89277E−01 | −7.26036E+01 |
| A3 | −8.93070E−03 | −2.23300E−02 | −4.63500E−02 | −3.37077E−02 | −1.11740E−01 | 2.59711E−01 |
| A4 | −7.19393E−02 | −1.95224E−01 | −5.47484E−02 | 1.43402E−01 | 2.43653E−02 | −4.27961E−01 |
| A5 | −6.98861E−02 | 1.13223E−01 | 6.76946E−02 | 1.06457E−02 | 3.28991E−02 | 2.67626E−01 |
| A6 | 1.28727E−01 | −4.55510E−02 | −6.80409E−02 | −2.80281E−02 | 7.23830E−03 | −6.35521E−02 |
| A7 | 9.55778E−02 | −1.04701E−02 | −1.52268E−03 | −3.20247E−03 | −3.80416E−03 | −4.77459E−03 |
| A8 | −3.00233E−01 | 3.68069E−02 | 1.29869E−02 | 1.47781E−03 | −1.84683E−03 | 3.18819E−03 |
| A9 | 2.34204E−01 | 1.25149E−02 | 1.20921E−02 | 1.27412E−03 | −1.73216E−04 | 2.64097E−04 |
| A10 | −6.92440E−02 | −1.52068E−02 | −4.50573E−03 | 3.55114E−04 | 2.34755E−04 | −1.19845E−04 |
| A11 | 0.00000E+00 | 0.00000E+00 | −3.32128E−03 | −1.70310E−04 | 0.00000E+00 | 0.00000E+00 |
| A12 | 0.00000E+00 | 0.00000E+00 | 1.10161E−03 | −5.93866E−05 | 0.00000E+00 | 0.00000E+00 |

Numerical Example 7

Figure 7:
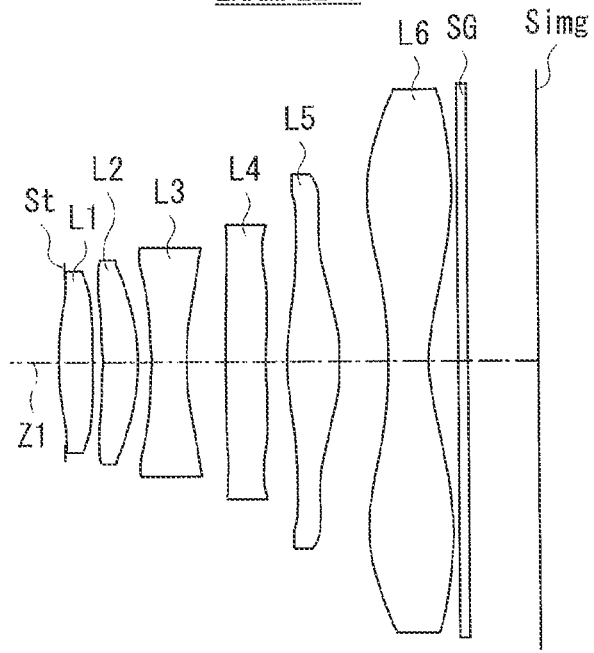
FIG. 7 illustrates a seventh configuration example of the image pickup lens and is a lens cross-sectional view corresponding to Numerical Example 7.

[Table 13] and [Table 14] each show specific lens data corresponding to the image pickup lens according to the seventh configuration example shown in FIG. 7. In particular, [Table 13] shows basic lens data thereof, and [Table 14] shows data related to the aspherical surfaces. [Table 13] also shows values of Fno, the angle of view 2ω, and the focal length f of the whole system.

In this seventh configuration example, the second lens L2 has positive refractive power. The aperture stop St is arranged on the object plane side of the first lens L1. Further, all of the first lens L1 to the sixth lens L6 are formed of resin materials. Further, the third lens L3 is formed of a material same as that of the fourth lens L4. All of the surfaces in the first lens L1 to the sixth lens L6 are aspherical.

TABLE 13

| Fno | 2.2 |
|---|---|
| f | 3.705 |
| 2ω | 76.2° |

Example 7 · lens data

| Si | Ri | Di | Ni | vi |
|---|---|---|---|---|
| (aperture) | ∞ | | | |
| 1(ASP) | 2.397 | 0.342 | 1.5346 | 56.27 |

TABLE 13-continued

| 2(ASP) | 268.329 | 0.100 | | |
|---|---|---|---|---|
| 3(ASP) | −9.769 | 0.360 | 1.5346 | 56.27 |
| 4(ASP) | −1.962 | 0.134 | | |
| 5(ASP) | −4.503 | 0.355 | 1.6068 | 27.03 |
| 6(ASP) | 3.006 | 0.400 | | |
| 7(ASP) | 9.854 | 0.400 | 1.6068 | 27.03 |
| 8(ASP) | 3.185 | 0.220 | | |
| 9(ASP) | 2.143 | 0.533 | 1.5346 | 56.27 |
| 10(ASP) | −2.108 | 0.488 | | |
| 11(ASP) | −15.319 | 0.410 | 1.5346 | 56.27 |
| 12(ASP) | 1.848 | 0.300 | | |
| 13 | ∞ | 0.100 | 1.5168 | 64.19 |
| 14 | ∞ | 0.727 | | |

TABLE 14

Example 7. aspherical surface data

| coefficient | surface number | | | | | |
|---|---|---|---|---|---|---|
| | 1 | 2 | 3 | 4 | 5 | 6 |
| K | 3.16839E−01 | 0.00000E+00 | 0.00000E+00 | 0.00000E+00 | 1.30140E+01 | 0.00000E+00 |
| A3 | 0.00000E+00 | 0.00000E+00 | 0.00000E+00 | 0.00000E+00 | 9.52732E−02 | 3.18200E−02 |
| A4 | −8.70628E−02 | −1.14320E−01 | −7.14355E−02 | 1.87250E−01 | 5.10514E−02 | 2.47567E−02 |
| A5 | 0.00000E+00 | 0.00000E+00 | 0.00000E+00 | 0.00000E+00 | −2.87675E−01 | −1.34632E−01 |
| A6 | 4.68659E−02 | −2.67692E−02 | 1.00233E−01 | −3.25994E−01 | 6.55982E−01 | −6.39464E−02 |
| A7 | 0.00000E+00 | 0.00000E+00 | 0.00000E+00 | 0.00000E+00 | −1.47006E+00 | 8.90681E−02 |
| A8 | −2.55961E−01 | 0.00000E+00 | 0.00000E+00 | 3.99507E−01 | 1.44305E+00 | 1.15726E−01 |
| A9 | 0.00000E+00 | 0.00000E+00 | 0.00000E+00 | 0.00000E+00 | −5.10658E−01 | −1.76080E−01 |
| A10 | 1.28446E−01 | 0.00000E+00 | 0.00000E+00 | −3.25519E−01 | 5.81705E−02 | 6.83350E−02 |
| A11 | 0.00000E+00 | 0.00000E+00 | 0.00000E+00 | 0.00000E+00 | 0.00000E+00 | 0.00000E+00 |
| A12 | −2.06033E−02 | 0.00000E+00 | 0.00000E+00 | 1.30726E−01 | 0.00000E+00 | 0.00000E+00 |

| coefficient | 7 | 8 | 9 | 10 | 11 | 12 |
|---|---|---|---|---|---|---|
| K | 2.37460E+01 | 0.00000E+00 | 0.00000E+00 | 0.00000E+00 | −6.89277E−01 | −7.26036E+01 |
| A3 | −5.09249E−02 | −1.14243E−01 | −1.30189E−01 | −9.79034E−02 | −1.55229E−01 | 3.68148E−01 |
| A4 | 1.44281E−02 | −1.94783E−01 | −7.20036E−02 | 2.14331E−01 | 8.16142E−02 | −5.59920E−01 |
| A5 | −1.13451E−01 | 1.56228E−01 | 9.98511E−02 | −9.54649E−03 | 3.47038E−03 | 3.34159E−01 |
| A6 | 1.64200E−02 | −4.37973E−02 | −6.13733E−02 | −3.08680E−02 | −2.21180E−04 | −7.56377E−02 |
| A7 | 1.10297E−01 | −1.36032E−02 | −1.03802E−02 | −5.97617E−04 | −1.60901E−03 | −7.42119E−03 |
| A8 | −3.20437E−01 | 3.71313E−02 | 8.44528E−03 | 2.74924E−03 | −2.44640E−04 | 4.05769E−03 |
| A9 | 2.13214E−01 | 1.33036E−02 | 1.32898E−02 | 1.33864E−03 | 9.51857E−05 | 6.46017E−04 |
| A10 | −5.34366E−02 | −1.51312E−02 | −2.41016E−02 | 3.59753E−05 | 1.12225E−05 | −2.39509E−04 |
| A11 | 0.00000E+00 | 0.00000E+00 | −2.68557E−03 | −3.00466E−04 | 0.00000E+00 | 0.00000E+00 |
| A12 | 0.00000E+00 | 0.00000E+00 | 3.51083E−04 | −1.63306E−05 | 0.00000E+00 | 0.00000E+00 |

Numerical Example 8

Figure 8:
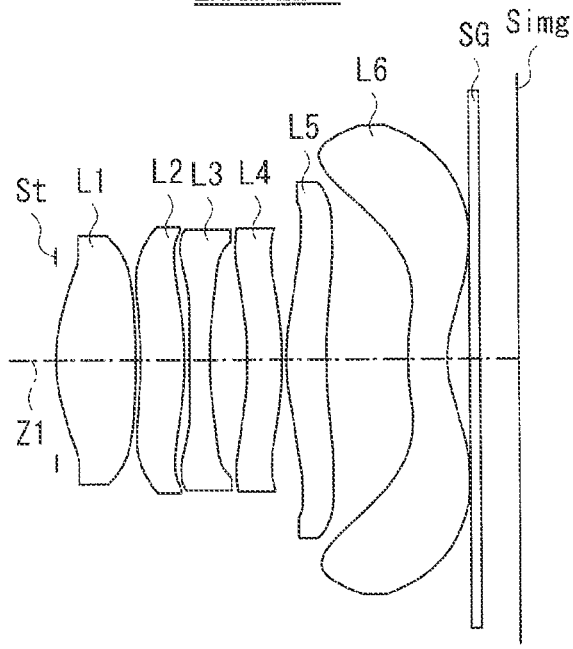
FIG. 8 illustrates an eighth configuration example of the image pickup lens and is a lens cross-sectional view corresponding to Numerical Example 8.

[Table 15] and [Table 16] each show specific lens data corresponding to the image pickup lens according to the eighth configuration example shown in FIG. 8. In particular, [Table 15] shows basic lens data thereof, and [Table 16] shows data related to the aspherical surfaces. [Table 15] also shows values of Fno, the angle of view 2ω, and the focal length f of the whole system.

In this eighth configuration example, the second lens L2 has positive refractive power. The aperture stop St is arranged on the object plane side of the first lens L1. Further, all of the first lens L1 to the sixth lens L6 are formed of resin materials. Further, the third lens L3 is formed of a material same as that of the fourth lens L4. All of the surfaces in the first lens L1 to the sixth lens L6 are aspherical.

TABLE 15

| Fno | 2.2 |
|---|---|
| f | 3.907 |
| 2ω | 72.3° |

TABLE 15-continued

Example 8 • lens data

| Si | Ri | Di | Ni | vi |
|---|---|---|---|---|
| (aperture) | ∞ | | | |
| 1(ASP) | 1.961 | 0.798 | 1.5346 | 56.27 |
| 2(ASP) | −17.033 | 0.050 | | |
| 3(ASP) | −5.344 | 0.461 | 1.5346 | 56.27 |
| 4(ASP) | −2.421 | 0.050 | | |
| 5(ASP) | 20.293 | 0.200 | 1.6504 | 21.54 |
| 6(ASP) | 2.578 | 0.387 | | |
| 7(ASP) | −3.010 | 0.346 | 1.6504 | 21.54 |
| 8(ASP) | −4.812 | 0.050 | | |
| 9(ASP) | 2.229 | 0.409 | 1.5752 | 34.33 |
| 10(ASP) | 5.165 | 0.829 | | |
| 11(ASP) | 1.869 | 0.400 | 1.5346 | 56.27 |
| 12(ASP) | 0.991 | 0.230 | | |
| 13 | ∞ | 0.110 | 1.5168 | 64.20 |
| 14 | ∞ | 0.410 | | |

TABLE 16

Example 8. aspherical surface data

| coefficient | surface number | | | | | |
|---|---|---|---|---|---|---|
| | 1 | 2 | 3 | 4 | 5 | 6 |
| K | −3.07412E+00 | 3.00000E+01 | −1.72893E+01 | −2.34946E+01 | −3.00000E+01 | −2.73135E+01 |
| A3 | 0.00000E+00 | 0.00000E+00 | −4.71313E−04 | 4.84471E−03 | −1.30462E−02 | −2.34851E−02 |
| A4 | 2.78623E−02 | −3.18579E−02 | 5.51813E−02 | −2.49136E−03 | −1.15435E−01 | −7.73453E−03 |
| A5 | 0.00000E+00 | 0.00000E+00 | −3.55831E−03 | −2.72157E−03 | 4.22230E−03 | −1.29453E−02 |
| A6 | −2.99634E−02 | −4.82379E−02 | −1.68732E−02 | 3.61800E−02 | −6.91408E−03 | −3.35011E−02 |
| A7 | 0.00000E+00 | 0.00000E+00 | 7.63268E−03 | 1.50566E−03 | 5.17068E−03 | 7.78275E−03 |
| A8 | 2.34110E−03 | 3.45810E−02 | 4.02956E−02 | 3.92790E−05 | 3.49431E−02 | 4.35559E−02 |
| A9 | 0.00000E+00 | 0.00000E+00 | 3.23932E−03 | 2.28534E−03 | 5.53634E−04 | 1.49355E−03 |

TABLE 16-continued

Example 8. aspherical surface data

| A10 | −1.55659E−02 | −1.59098E−02 | −1.56880E−02 | −2.29040E−02 | −1.26437E−02 | −7.44626E−03 |
| A11 | 0.00000E+00 | 0.00000E+00 | 0.00000E+00 | 9.74348E−04 | −2.72915E−04 | −2.89203E−03 |
| A12 | 0.00000E+00 | 0.00000E+00 | 0.00000E+00 | 9.41249E−03 | 5.15961E−03 | 8.90203E−03 |
| A13 | 0.00000E+00 | 0.00000E+00 | 0.00000E+00 | 0.00000E+00 | 0.00000E+00 | 0.00000E+00 |
| A14 | 0.00000E+00 | 0.00000E+00 | 0.00000E+00 | 0.00000E+00 | 0.00000E+00 | 0.00000E+00 |

| coefficient | 7 | 8 | 9 | 10 | 11 | 12 |
| --- | --- | --- | --- | --- | --- | --- |
| K | −3.00000E+01 | 7.00982E+00 | −1.02345E+01 | −5.26677E+00 | −1.39634E+01 | −4.39914E+00 |
| A3 | 0.00000E+00 | 0.00000E+00 | 0.00000E+00 | 0.00000E+00 | −3.47128E−02 | −9.41034E−02 |
| A4 | −1.36449E−02 | −3.88991E−02 | −6.25360E−02 | −3.06152E−02 | −2.08621E−01 | −2.94068E−02 |
| A5 | 0.00000E+00 | 0.00000E+00 | 0.00000E+00 | 0.00000E+00 | 1.18492E−02 | −7.77990E−03 |
| A6 | 1.25575E−02 | 3.83924E−02 | 2.63327E−02 | −9.70540E−03 | 3.97560E−02 | 2.34200E−02 |
| A7 | 0.00000E+00 | 0.00000E+00 | 0.00000E+00 | 0.00000E+00 | −2.61685E−03 | −3.27941E−04 |
| A8 | −2.28422E−02 | 1.09440E−02 | −7.13853E−03 | 9.07751E−03 | 2.74675E−03 | −5.64949E−03 |
| A9 | 0.00000E+00 | 0.00000E+00 | 0.00000E+00 | 0.00000E+00 | 5.25255E−04 | −2.07902E−04 |
| A10 | 3.45470E−02 | 3.26483E−03 | 2.17769E−03 | −2.14891E−03 | −3.04173E−03 | 9.85283E−04 |
| A11 | 0.00000E+00 | 0.00000E+00 | 0.00000E+00 | 0.00000E+00 | 2.37148E−04 | −1.31860E−05 |
| A12 | −1.12678E−02 | −3.13308E−03 | −6.14295E−04 | 7.01960E−05 | 5.25793E−04 | −7.32380E−05 |
| A13 | 0.00000E+00 | 0.00000E+00 | 0.00000E+00 | 0.00000E+00 | −4.92790E−05 | 8.45500E−06 |
| A14 | 0.00000E+00 | 0.00000E+00 | 0.00000E+00 | 0.00000E+00 | −2.18890E−05 | −1.90000E−06 |

Numerical Example 9

Figure 9:
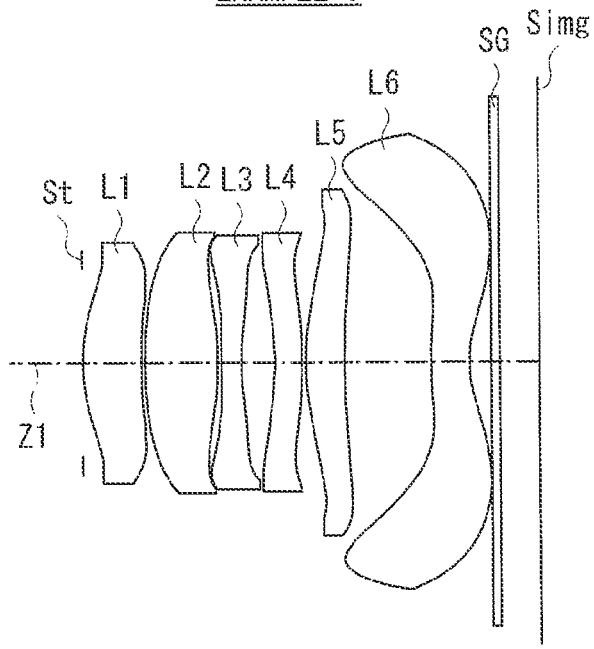
FIG. 9 illustrates a ninth configuration example of the image pickup lens and is a lens cross-sectional view corresponding to Numerical Example 9.

[Table 17] and [Table 18] each show specific lens data corresponding to the image pickup lens according to the ninth configuration example shown in FIG. 9. In particular, [Table 17] shows basic lens data thereof, and [Table 18] shows data related to the aspherical surfaces. [Table 17] also shows values of Fno, the angle of view 2ω, and the focal length f of the whole system.

In this ninth configuration example, the second lens L2 has positive refractive power. The aperture stop St is arranged on the object plane side of the first lens L1. Further, all of the first lens L1 to the sixth lens L6 are formed of resin materials. Further, the third lens L3 is formed of a material same as that of the fourth lens L4. All of the surfaces in the first lens L1 to the sixth lens L6 are aspherical.

TABLE 17

| Fno | 2.2 |
| f | 3.907 |
| 2ω | 72.3° |

TABLE 17-continued

Example 9 · lens data

| Si | Ri | Di | Ni | νi |
| --- | --- | --- | --- | --- |
| (aperture) | ∞ | | | |
| 1(ASP) | 1.998 | 0.603 | 1.5346 | 56.27 |
| 2(ASP) | 3.900 | 0.040 | | |
| 3(ASP) | 4.210 | 0.758 | 1.5346 | 56.27 |
| 4(ASP) | −2.615 | 0.040 | | |
| 5(ASP) | −39.717 | 0.200 | 1.6504 | 21.54 |
| 6(ASP) | 2.545 | 0.343 | | |
| 7(ASP) | −3.018 | 0.282 | 1.6504 | 21.54 |
| 8(ASP) | −5.098 | 0.040 | | |
| 9(ASP) | 2.443 | 0.400 | 1.6188 | 25.20 |
| 10(ASP) | 8.458 | 0.881 | | |
| 11(ASP) | 2.075 | 0.400 | 1.5347 | 56.16 |
| 12(ASP) | 1.020 | 0.223 | | |
| 13 | ∞ | 0.110 | 1.5168 | 64.20 |
| 14 | ∞ | 0.410 | | |

TABLE 18

Example 9. aspherical surface data

| | surface number | | | | | |
| --- | --- | --- | --- | --- | --- | --- |
| coefficient | 1 | 2 | 3 | 4 | 5 | 6 |
| K | −3.60842E+00 | −2.70720E+01 | −3.00000E+01 | −2.79479E+01 | 1.17958E+01 | −2.62295E+01 |
| A3 | 0.00000E+00 | 0.00000E+00 | −3.98344E−03 | 3.13641E−03 | −8.63858E−03 | −2.22068E−02 |
| A4 | 2.27669E−02 | −1.78664E−02 | 4.39532E−02 | −1.66769E−02 | −9.62561E−03 | −3.07255E−03 |
| A5 | 0.00000E+00 | 0.00000E+00 | −8.14920E−03 | −2.23369E−03 | 7.10826E−03 | −1.88462E−02 |
| A6 | −3.28536E−02 | −6.85776E−02 | −1.76657E−02 | 3.88158E−02 | −7.84200E−03 | −4.63634E−02 |
| A7 | 0.00000E+00 | 0.00000E+00 | 4.50752E−03 | 5.07455E−03 | 2.48456E−03 | 7.24533E−04 |
| A8 | 2.54410E−03 | 3.65435E−02 | 3.77037E−02 | 2.21073E−02 | 3.34087E−02 | 4.16310E−02 |
| A9 | 0.00000E+00 | 0.00000E+00 | 2.35284E−03 | 3.05384E−03 | 4.27737E−04 | 1.95228E−03 |
| A10 | −1.06835E−02 | −1.46360E−02 | −1.42607E−02 | −2.30393E−02 | −1.22063E−02 | −6.26068E−03 |
| A11 | 0.00000E+00 | 0.00000E+00 | 0.00000E+00 | 6.73082E−04 | 2.58723E−04 | −1.70829E−03 |
| A12 | 0.00000E+00 | 0.00000E+00 | 0.00000E+00 | 9.21632E−03 | 5.69750E−03 | 1.01274E−02 |
| A13 | 0.00000E+00 | 0.00000E+00 | 0.00000E+00 | 0.00000E+00 | 0.00000E+00 | 0.00000E+00 |
| A14 | 0.00000E+00 | 0.00000E+00 | 0.00000E+00 | 0.00000E+00 | 0.00000E+00 | 0.00000E+00 |

TABLE 18-continued

| | Example 9. aspherical surface data | | | | | |
|---|---|---|---|---|---|---|
| coefficient | 7 | 8 | 9 | 10 | 11 | 12 |
| K  | −3.00000E+01 | −2.04560E−01 | −1.51945E+01 | 1.79517E+01 | −1.50284E+01 | −4.09290E+00 |
| A3 | 0.00000E+00 | 0.00000E+00 | 0.00000E+00 | 0.00000E+00 | −4.58600E−02 | −1.18433E−01 |
| A4 | 1.39271E−02 | −1.78212E−02 | −2.62604E−02 | −1.36441E−02 | −2.02028E−01 | −1.49776E−02 |
| A5 | 0.00000E+00 | 0.00000E+00 | 0.00000E+00 | 0.00000E+00 | 1.31090E−02 | −1.84077E−03 |
| A6 | −1.22732E−02 | 3.88557E−02 | 2.10250E−02 | −8.56263E−03 | 4.03539E−02 | 1.76797E−02 |
| A7 | 0.00000E+00 | 0.00000E+00 | 0.00000E+00 | 0.00000E+00 | −2.77523E−03 | −4.82281E−04 |
| A8 | −2.56849E−02 | 6.97329E−03 | −9.31557E−03 | 7.43828E−03 | 2.37742E−03 | −5.41747E−03 |
| A9 | 0.00000E+00 | 0.00000E+00 | 0.00000E+00 | 0.00000E+00 | 4.79950E−04 | −9.54777E−05 |
| A10 | 3.91060E−02 | 9.93550E−04 | 2.44939E−03 | −2.32002E−03 | −3.07502E−03 | 1.00052E−03 |
| A11 | 0.00000E+00 | 0.00000E+00 | 0.00000E+00 | 0.00000E+00 | 2.34082E−04 | −1.85748E−05 |
| A12 | −1.15841E−02 | −2.46210E−03 | −5.43074E−04 | 1.16740E−04 | 5.21663E−04 | −7.28774E−05 |
| A13 | 0.00000E+00 | 0.00000E+00 | 0.00000E+00 | 0.00000E+00 | −3.98212E−05 | 6.30402E−06 |
| A14 | 0.00000E+00 | 0.00000E+00 | 0.00000E+00 | 0.00000E+00 | −1.98512E−05 | −1.94819E−06 |

Numerical Example 10

Figure 10:
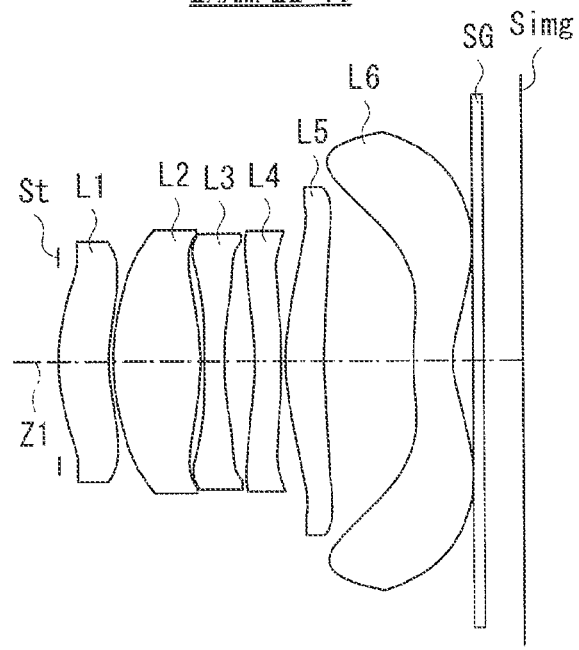
FIG. 10 illustrates a tenth configuration example of the image pickup lens and is a lens cross-sectional view corresponding to Numerical Example 10.

[Table 19] and [Table 20] each show specific lens data corresponding to the image pickup lens according to the tenth configuration example shown in FIG. 10. In particular, [Table 19] shows basic lens data thereof, and [Table 20] shows data related to the aspherical surfaces. [Table 19] also shows values of Fno, the angle of view $2\omega$, and the focal length f of the whole system.

In this tenth configuration example, the second lens L2 has positive refractive power. The aperture stop St is arranged on the object plane side of the first lens L1. Further, all of the first lens L1 to the sixth lens L6 are formed of resin materials. Further, the third lens L3 is formed of a material same as that of the fourth lens L4. All of the surfaces in the first lens L1 to the sixth lens L6 are aspherical.

TABLE 19

| Fno | 2.02 |
|---|---|
| f | 3.907 |
| $2\omega$ | 72.3° |

TABLE 19-continued

| Example 10 • lens data | | | | |
|---|---|---|---|---|
| Si | Ri | Di | Ni | vi |
| (aperture) | ∞ | | | |
| 1(ASP) | 2.028 | 0.515 | 1.5414 | 50.51 |
| 2(ASP) | 2.053 | 0.040 | | |
| 3(ASP) | 2.033 | 0.889 | 1.5346 | 56.27 |
| 4(ASP) | −2.357 | 0.040 | | |
| 5(ASP) | −26.249 | 0.200 | 1.6504 | 21.54 |
| 6(ASP) | 2.340 | 0.312 | | |
| 7(ASP) | −2.481 | 0.269 | 1.6504 | 21.54 |
| 8(ASP) | −7.028 | 0.040 | | |
| 9(ASP) | 1.887 | 0.400 | 1.6445 | 22.10 |
| 10(ASP) | 7.201 | 0.902 | | |
| 11(ASP) | 2.001 | 0.400 | 1.5486 | 45.68 |
| 12(ASP) | 0.977 | 0.202 | | |
| 13 | ∞ | 0.110 | 1.5168 | 64.20 |
| 14 | ∞ | 0.410 | | |

TABLE 20

| | Example 10. aspherical surface data | | | | | |
|---|---|---|---|---|---|---|
| | surface number | | | | | |
| coefficient | 1 | 2 | 3 | 4 | 5 | 6 |
| K  | −5.85369E+00 | −1.65715E+01 | −1.50791E+01 | −2.12601E+01 | −2.99949E+01 | −2.50541E+01 |
| A3 | 0.00000E+00 | 0.00000E+00 | −8.90140E−04 | 9.54624E−04 | −9.93114E−03 | 9.92556E−03 |
| A4 | 3.35501E−02 | −2.12855E−02 | 3.96962E−02 | −1.56402E−02 | −9.56665E−02 | 1.30589E−03 |
| A5 | 0.00000E+00 | 0.00000E+00 | −9.82935E−03 | −2.51112E−04 | 7.32403E−03 | −3.05132E−02 |
| A6 | −3.56060E−02 | −7.75558E−02 | −1.91168E−02 | 4.02927E−02 | −8.13829E−03 | −5.52404E−02 |
| A7 | 0.00000E+00 | 0.00000E+00 | 3.39283E−03 | 5.85961E−03 | 2.41453E−03 | −3.03395E−03 |
| A8 | −4.82153E−03 | 4.23542E−02 | 3.73551E−02 | 2.60189E−03 | 3.34880E−02 | 4.03547E−02 |
| A9 | 0.00000E+00 | 0.00000E+00 | 2.51224E−03 | 3.30511E−03 | 5.50767E−03 | 1.29410E−03 |
| A10 | −5.53545E−03 | −1.56345E−02 | −1.38321E−02 | −2.28757E−02 | −1.20610E−02 | −6.57888E−03 |
| A11 | 0.00000E+00 | 0.00000E+00 | 0.00000E+00 | 7.13302E−04 | 3.84118E−04 | −1.54882E−03 |
| A12 | 0.00000E+00 | 0.00000E+00 | 0.00000E+00 | 9.21362E−03 | 5.75529E−03 | 1.07823E−02 |
| A13 | 0.00000E+00 | 0.00000E+00 | 0.00000E+00 | 0.00000E+00 | 0.00000E+00 | 0.00000E+00 |
| A14 | 0.00000E+00 | 0.00000E+00 | 0.00000E+00 | 0.00000E+00 | 0.00000E+00 | 0.00000E+00 |
| coefficient | 7 | 8 | 9 | 10 | 11 | 12 |
| K  | −3.00000E+01 | 3.49869E+00 | −1.37830E+01 | 1.32512E+01 | −2.97053E+01 | −7.92777E+00 |
| A3 | 5.09786E−02 | 1.00595E−02 | −2.29668E−02 | −3.02257E−02 | −4.20303E−02 | −3.23657E−02 |
| A4 | 1.98259E−02 | −3.04836E−02 | −2.41447E−02 | −6.80171E−03 | −1.94863E−01 | −4.64171E−02 |
| A5 | −4.11609E−03 | 1.68150E−03 | 4.41614E−03 | 6.09780E−03 | 1.41765E−02 | −1.88359E−02 |
| A6 | −2.12627E−02 | 4.01662E−02 | 2.70935E−02 | −6.30469E−03 | 4.06434E−02 | 2.55955E−02 |
| A7 | −8.30507E−03 | 8.95118E−04 | −8.54235E−04 | 1.22457E−05 | −3.06697E−03 | 2.79010E−03 |

TABLE 20-continued

| | | Example 10. aspherical surface data | | | |
|---|---|---|---|---|---|
| A8 | −2.91726E−02 | 7.98175E−03 | −1.02595E−02 | 6.78715E−03 | 2.17970E−03 | −6.35075E−03 |
| A9 | −1.98886E−04 | −4.79983E−05 | −5.29503E−04 | −4.42513E−04 | 3.90296E−04 | −5.87296E−04 |
| A10 | 4.13313E−02 | 8.12906E−04 | 2.27931E−03 | −2.34511E−03 | −3.05802E−03 | 9.77771E−04 |
| A11 | 1.61027E−03 | −2.75854E−04 | 2.12610E−04 | −1.52950E−06 | 2.54288E−04 | 1.18064E−06 |
| A12 | −1.15235E−02 | −2.61365E−03 | −5.37058E−04 | 1.58270E−04 | 5.31509E−04 | −4.44237E−05 |
| A13 | 0.00000E+00 | 0.00000E+00 | 0.00000E+00 | 0.00000E+00 | −4.24070E−05 | 1.16347E−05 |
| A14 | 0.00000E+00 | 0.00000E+00 | 0.00000E+00 | 0.00000E+00 | −2.15690E−05 | −6.51825E−06 |

Numerical Example 11

Figure 11:
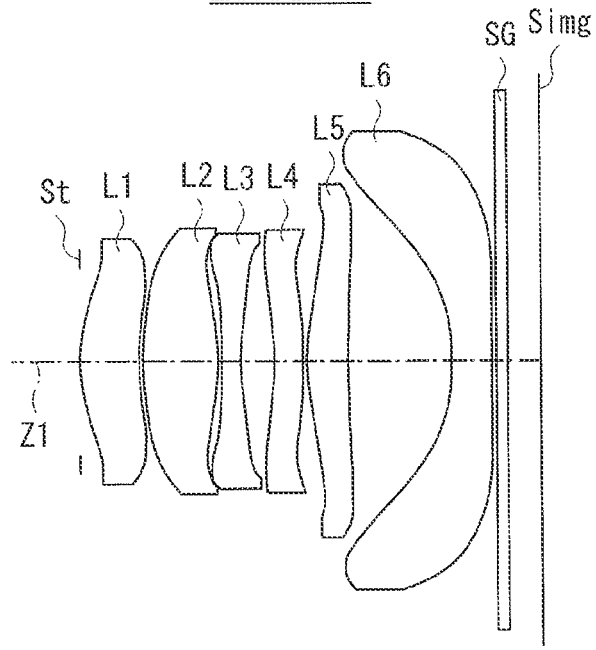
FIG. 11 illustrates an eleventh configuration example of the image pickup lens and is a lens cross-sectional view corresponding to Numerical Example 11.

[Table 21] and [Table 22] each show specific lens data corresponding to the image pickup lens according to the eleventh configuration example shown in FIG. 11. In particular, [Table 21] shows basic lens data thereof, and [Table 22] shows data related to the aspherical surfaces. [Table 21] also shows values of Fno, the angle of view 2ω, and the focal length f of the whole system.

In this eleventh configuration example, the second lens L2 has positive refractive power. The aperture stop St is arranged on the object plane side of the first lens L1. Further, all of the first lens L1 to the sixth lens L6 are formed of resin materials. Further, the third lens L3 is formed of a material same as that of the fourth lens L4. All of the surfaces in the first lens L1 to the sixth lens L6 are aspherical.

TABLE 21

| Fno | 2.2 |
|---|---|
| f | 3.907 |
| 2ω | 72.28° |

TABLE 21-continued

| | Example 11 • lens data | | | |
|---|---|---|---|---|
| Si | Ri | Di | Ni | vi |
| (aperture) | ∞ | | | |
| 1(ASP) | 1.925 | 0.599 | 1.5346 | 56.27 |
| 2(ASP) | 2.911 | 0.040 | | |
| 3(ASP) | 3.389 | 0.764 | 1.5346 | 56.27 |
| 4(ASP) | −2.452 | 0.040 | | |
| 5(ASP) | −91.137 | 0.200 | 1.6504 | 21.54 |
| 6(ASP) | 2.519 | 0.344 | | |
| 7(ASP) | −2.218 | 0.296 | 1.6504 | 21.54 |
| 8(ASP) | −4.606 | 0.040 | | |
| 9(ASP) | 1.931 | 0.420 | 1.6097 | 26.60 |
| 10(ASP) | 11.032 | 1.067 | | |
| 11(ASP) | −2.200 | 0.400 | 1.5346 | 56.27 |
| 12(ASP) | −74.479 | 0.050 | | |
| 13 | ∞ | 0.110 | 1.5168 | 64.20 |
| 14 | ∞ | 0.359 | | |

TABLE 22

Example 11. aspherical surface data

| | surface number | | | | | |
|---|---|---|---|---|---|---|
| coefficient | 1 | 2 | 3 | 4 | 5 | 6 |
| K | −3.77614E+00 | −2.33612E+01 | −3.00000E+01 | −1.82083E+01 | −1.81619E+01 | −1.78771E+01 |
| A3 | 0.00000E+00 | 0.00000E+00 | −4.57098E−03 | 2.09104E−03 | −1.36615E−02 | −1.72773E−02 |
| A4 | 3.01755E−02 | −1.71453E−03 | 4.17225E−02 | −1.28869E−02 | −9.86883E−03 | −6.86493E−03 |
| A5 | 0.00000E+00 | 0.00000E+00 | −6.04947E−03 | 1.16741E−03 | 6.44017E−03 | −2.35859E−03 |
| A6 | −3.36823E−02 | −8.14691E−02 | −1.65795E−02 | 4.14478E−02 | −7.13709E−03 | −4.58769E−02 |
| A7 | 0.00000E+00 | 0.00000E+00 | 4.50865E−03 | 6.70008E−03 | 3.71748E−03 | 2.01396E−03 |
| A8 | 1.70906E−03 | 3.62841E−02 | 3.74650E−02 | 3.10791E−02 | 3.36493E−02 | 4.23227E−02 |
| A9 | 0.00000E+00 | 0.00000E+00 | 2.26813E−03 | 3.65189E−03 | 7.62774E−04 | 1.85366E−03 |
| A10 | −1.12853E−02 | −1.35998E−02 | −1.40809E−02 | −2.28249E−02 | −1.19390E−02 | −6.43968E−03 |
| A11 | 0.00000E+00 | 0.00000E+00 | 0.00000E+00 | 5.41211E−04 | 4.09258E−04 | −1.30871E−03 |
| A12 | 0.00000E+00 | 0.00000E+00 | 0.00000E+00 | 8.97637E−03 | 5.75458E−03 | 1.10669E−02 |
| A13 | 0.00000E+00 | 0.00000E+00 | 0.00000E+00 | 0.00000E+00 | 0.00000E+00 | 0.00000E+00 |
| A14 | 0.00000E+00 | 0.00000E+00 | 0.00000E+00 | 0.00000E+00 | 0.00000E+00 | 0.00000E+00 |
| coefficient | 7 | 8 | 9 | 10 | 11 | 12 |
| K | −2.88575E+01 | 1.07199E+00 | −1.76687E+01 | 2.67912E+01 | −1.35278E+01 | 3.00000E+01 |
| A3 | 4.17557E−02 | 2.32710E−02 | −1.30489E−02 | −1.14133E−02 | 2.21201E−02 | 1.14526E−01 |
| A4 | 1.31793E−02 | −2.27720E−02 | −3.05297E−02 | −1.25620E−02 | −1.85422E−01 | −1.20023E−01 |
| A5 | 1.03953E−03 | 2.46439E−04 | −2.15977E−04 | 3.81699E−03 | 1.44558E−02 | −3.47697E−03 |
| A6 | −1.52602E−02 | 3.90285E−02 | 2.39831E−02 | −5.29736E−03 | 3.97132E−02 | 2.44348E−02 |
| A7 | −4.72190E−03 | 9.86406E−05 | 7.88861E−04 | 3.68846E−04 | −3.32920E−03 | 1.71985E−03 |
| A8 | −2.75268E−02 | 7.75095E−03 | −9.55415E−03 | 6.72444E−03 | 2.20142E−03 | −5.60040E−03 |
| A9 | 8.70095E−05 | −5.00346E−05 | 1.24530E−03 | −3.35701E−03 | 4.05164E−03 | −3.63782E−04 |
| A10 | 4.10931E−02 | 8.88531E−04 | 2.20751E−03 | −2.38711E−03 | −3.04767E−03 | 9.50001E−03 |
| A11 | 9.04508E−04 | −2.65424E−04 | 5.76150E−06 | 1.18720E−05 | 2.46450E−04 | −3.45738E−05 |
| A12 | −1.25411E−02 | −2.59183E−03 | −5.54352E−04 | 1.80304E−04 | 5.27745E−04 | −7.11457E−05 |
| A13 | 0.00000E+00 | 0.00000E+00 | 0.00000E+00 | 0.00000E+00 | −4.49761E−05 | 1.21889E−05 |
| A14 | 0.00000E+00 | 0.00000E+00 | 0.00000E+00 | 0.00000E+00 | −2.40781E−05 | −2.94096E−06 |

Numerical Example 12

Figure 12:
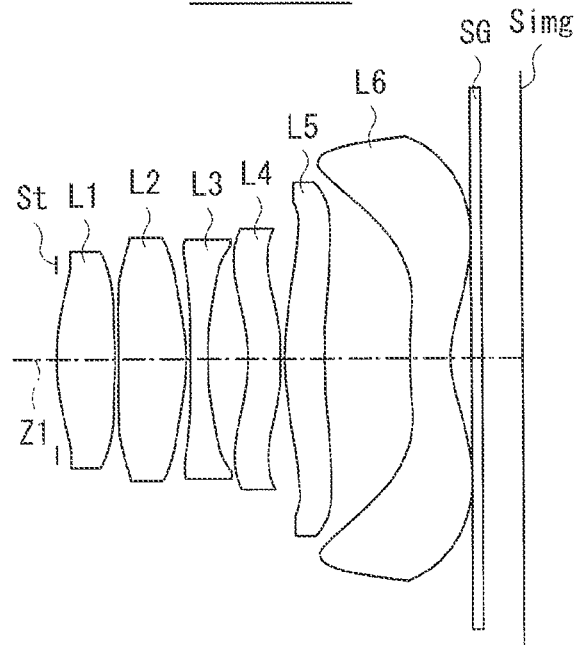
FIG. 12 illustrates a twelfth configuration example of the image pickup lens and is a lens cross-sectional view corresponding to Numerical Example 12.

[Table 23] and [Table 24] each show specific lens data corresponding to the image pickup lens according to the twelfth configuration example shown in FIG. 12. In particular, [Table 23] shows basic lens data thereof, and [Table 24] shows data related to the aspherical surfaces. [Table 23] also shows values of Fno, the angle of view $2\omega$, and the focal length f of the whole system.

In this twelfth configuration example, the second lens L2 has positive refractive power. The aperture stop St is arranged on the object plane side of the first lens L1. Further, all of the first lens L1 to the sixth lens L6 are formed of resin materials. Further, the third lens L3 is formed of a material different from that of the fourth lens L4. All of the surfaces in the first lens L1 to the sixth lens L6 are aspherical.

Numerical Example 13

Figure 13:
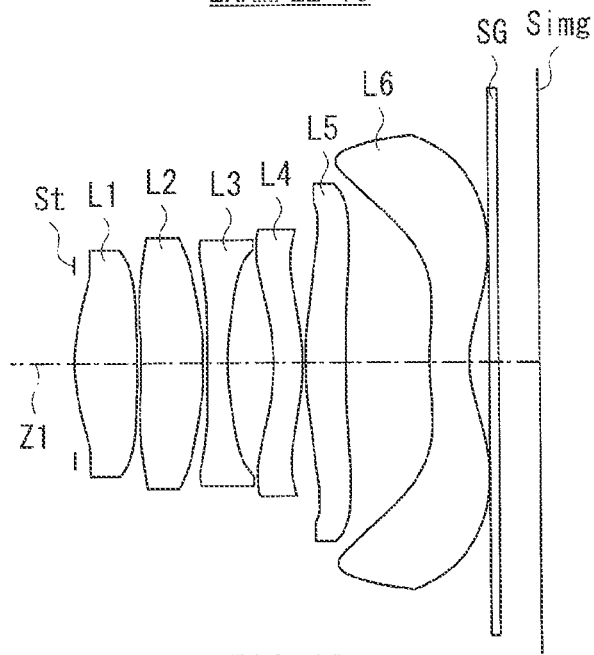
FIG. 13 illustrates a thirteenth configuration example of the image pickup lens and is a lens cross-sectional view corresponding to Numerical Example 13.

[Table 25] and [Table 26] each show specific lens data corresponding to the image pickup lens according to the thirteenth configuration example shown in FIG. 13. In particular, [Table 25] shows basic lens data thereof, and [Table 26] shows data related to the aspherical surfaces. [Table 25] also shows values of Fno, the angle of view $2\omega$, and the focal length f of the whole system.

In this thirteenth configuration example, the second lens L2 has positive refractive power. The aperture stop St is arranged on the object plane side of the first lens L1. Further, only the second lens L2 in the first lens L1 to the sixth lens L6 is formed of a glass material. Further, the third lens L3 is formed of a material different from that of the fourth lens L4. All of the surfaces in the first lens L1 to the sixth lens L6 are aspherical.

TABLE 23

| Fno | 2.2 |
| f | 3.907 |
| $2\omega$ | 72.3° |

Example 12 • lens data

| Si | Ri | Di | Ni | vi |
|---|---|---|---|---|
| (aperture) | ∞ | | | |
| 1(ASP) | 2.215 | 0.586 | 1.5305 | 55.70 |
| 2(ASP) | −16.001 | 0.040 | | |
| 3(ASP) | −19.914 | 0.689 | 1.5305 | 55.70 |
| 4(ASP) | −1.894 | 0.040 | | |
| 5(ASP) | 110.845 | 0.174 | 1.6504 | 21.54 |
| 6(ASP) | 2.034 | 0.410 | | |
| 7(ASP) | −2.037 | 0.340 | 1.5305 | 55.70 |
| 8(ASP) | −2.418 | 0.040 | | |
| 9(ASP) | 3.154 | 0.400 | 1.6504 | 21.54 |
| 10(ASP) | 6.321 | 0.862 | | |
| 11(ASP) | 2.485 | 0.416 | 1.5305 | 55.70 |
| 12(ASP) | 1.137 | 0.213 | | |
| 13 | ∞ | 0.110 | 1.5168 | 64.20 |
| 14 | ∞ | 0.410 | | |

TABLE 25

| Fno | 2.2 |
| f | 3.907 |
| $2\omega$ | 72.3° |

Example 13 • lens data

| Si | Ri | Di | Ni | vi |
|---|---|---|---|---|
| (aperture) | ∞ | | | |
| 1(ASP) | 2.036 | 0.617 | 1.5305 | 55.70 |
| 2(ASP) | −19.698 | 0.040 | | |
| 3(ASP) | −10.584 | 0.636 | 1.6970 | 55.50 |
| 4(ASP) | −2.219 | 0.040 | | |
| 5(ASP) | −54.977 | 0.200 | 1.6504 | 21.54 |
| 6(ASP) | 2.201 | 0.460 | | |
| 7(ASP) | −2.193 | 0.284 | 1.5305 | 55.70 |
| 8(ASP) | −3.111 | 0.040 | | |
| 9(ASP) | 3.415 | 0.400 | 1.6504 | 21.54 |
| 10(ASP) | 8.673 | 0.845 | | |
| 11(ASP) | 2.264 | 0.400 | 1.5305 | 55.70 |
| 12(ASP) | 1.073 | 0.198 | | |
| 13 | ∞ | 0.110 | 1.5168 | 64.20 |
| 14 | ∞ | 0.410 | | |

TABLE 24

Example 12. aspherical surface data

| coefficient | surface number | | | | | |
|---|---|---|---|---|---|---|
| | 1 | 2 | 3 | 4 | 5 | 6 |
| K | −4.69086E+00 | 7.76372E+00 | 2.99254E+01 | −2.58992E+01 | −3.00000E+01 | −2.99988E+01 |
| A3 | 0.00000E+00 | 0.00000E+00 | 0.00000E+00 | 0.00000E+00 | 0.00000E+00 | 0.00000E+00 |
| A4 | 9.56192E−03 | −2.17577E−03 | 8.50216E−02 | −1.64728E−02 | −6.51574E−02 | 7.37406E−04 |
| A5 | 0.00000E+00 | 0.00000E+00 | 0.00000E+00 | 0.00000E+00 | 0.00000E+00 | 0.00000E+00 |
| A6 | −4.89387E−02 | −6.49003E−02 | −2.17514E−02 | 2.92108E−02 | −1.48804E−02 | −2.07376E−02 |
| A7 | 0.00000E+00 | 0.00000E+00 | 0.00000E+00 | 0.00000E+00 | 0.00000E+00 | 0.00000E+00 |
| A8 | −1.19331E−02 | 2.29409E−02 | 3.40663E−02 | −5.25552E−03 | 3.40029E−02 | 3.72348E−02 |
| A9 | 0.00000E+00 | 0.00000E+00 | 0.00000E+00 | 0.00000E+00 | 0.00000E+00 | 0.00000E+00 |
| A10 | −3.56104E−03 | −1.04127E−02 | −1.71691E−02 | −2.42607E−02 | −1.31660E−02 | −6.29135E−03 |
| A11 | 0.00000E+00 | 0.00000E+00 | 0.00000E+00 | 0.00000E+00 | 0.00000E+00 | 0.00000E+00 |
| A12 | 0.00000E+00 | 0.00000E+00 | 0.00000E+00 | 9.86832E−03 | 5.60362E−03 | 7.25589E−03 |

| coefficient | 7 | 8 | 9 | 10 | 11 | 12 |
|---|---|---|---|---|---|---|
| K | −3.69637E+00 | −5.53028E−01 | −1.13375E+01 | −3.00000E+01 | −2.99996E+01 | −6.59703E+00 |
| A3 | 0.00000E+00 | 0.00000E+00 | 0.00000E+00 | 0.00000E+00 | 0.00000E+00 | 0.00000E+00 |
| A4 | 4.41410E−02 | 1.39339E−02 | −3.23746E−02 | −1.25811E−02 | −2.08204E−01 | −9.45557E−02 |
| A5 | 0.00000E+00 | 0.00000E+00 | 0.00000E+00 | 0.00000E+00 | 0.00000E+00 | 0.00000E+00 |
| A6 | 3.92510E−02 | 5.79893E−02 | 1.14500E−02 | −9.91519E−03 | 4.24484E−02 | 2.98475E−02 |
| A7 | 0.00000E+00 | 0.00000E+00 | 0.00000E+00 | 0.00000E+00 | 0.00000E+00 | 0.00000E+00 |
| A8 | −1.09568E−02 | 3.69920E−03 | −5.05187E−03 | 7.52712E−03 | 3.75553E−03 | −7.19328E−03 |
| A9 | 0.00000E+00 | 0.00000E+00 | 0.00000E+00 | 0.00000E+00 | 0.00000E+00 | 0.00000E+00 |
| A10 | 5.67624E−03 | 1.13789E−03 | 2.42356E−03 | −1.88064E−03 | −3.52807E−03 | 1.00713E−03 |
| A11 | 0.00000E+00 | 0.00000E+00 | 0.00000E+00 | 0.00000E+00 | 0.00000E+00 | 0.00000E+00 |
| A12 | −2.27384E−03 | −3.54903E−03 | −7.35152E−04 | 4.19551E−05 | 5.01065E−04 | −7.18496E−05 |

TABLE 26

Example 13. aspherical surface data

| coefficient | surface number | | | | | |
|---|---|---|---|---|---|---|
| | 1 | 2 | 3 | 4 | 5 | 6 |
| K | −3.92312E+00 | 3.00000E+01 | 3.00000E+01 | −2.66702E+01 | 2.89344E+01 | −3.00000E+01 |
| A3 | 0.00000E+00 | 0.00000E+00 | 0.00000E+00 | 0.00000E+00 | 0.00000E+00 | 0.00000E+00 |
| A4 | 1.43454E−02 | −2.14634E−03 | 8.14131E−02 | −2.79940E−02 | −6.77694E−02 | −3.28588E−03 |
| A5 | 0.00000E+00 | 0.00000E+00 | 0.00000E+00 | 0.00000E+00 | 0.00000E+00 | 0.00000E+00 |
| A6 | −4.94170E−02 | −6.25718E−02 | −1.73096E−02 | 2.81998E−02 | −1.46951E−02 | −1.34658E−02 |
| A7 | 0.00000E+00 | 0.00000E+00 | 0.00000E+00 | 0.00000E+00 | 0.00000E+00 | 0.00000E+00 |
| A8 | −1.66782E−02 | 1.85217E−02 | 3.56222E−02 | −3.53180E−03 | 3.28813E−02 | 4.20583E−02 |
| A9 | 0.00000E+00 | 0.00000E+00 | 0.00000E+00 | 0.00000E+00 | 0.00000E+00 | 0.00000E+00 |
| A10 | −7.63018E−03 | −1.20153E−02 | −2.15312E−02 | −2.36888E−02 | −1.29543E−02 | −8.16493E−03 |
| A11 | 0.00000E+00 | 0.00000E+00 | 0.00000E+00 | 0.00000E+00 | 0.00000E+00 | 0.00000E+00 |
| A12 | 0.00000E+00 | 0.00000E+00 | 0.00000E+00 | 8.84415E−03 | 6.59320E−03 | 1.21856E−02 |
| coefficient | 7 | 8 | 9 | 10 | 11 | 12 |
| K | −4.76179E+00 | 9.77771E−01 | −1.22708E+01 | −3.00000E+01 | −3.00000E+01 | −7.24057E+00 |
| A3 | 0.00000E+00 | 0.00000E+00 | 0.00000E+00 | 0.00000E+00 | 0.00000E+00 | 0.00000E+00 |
| A4 | 1.74541E−02 | 2.54669E−03 | −3.88474E−02 | −1.48634E−02 | −2.23193E−01 | −9.80454E−02 |
| A5 | 0.00000E+00 | 0.00000E+00 | 0.00000E+00 | 0.00000E+00 | 0.00000E+00 | 0.00000E+00 |
| A6 | 2.04075E−02 | 5.64376E−02 | 1.62956E−02 | −9.56957E−03 | 4.72656E−02 | 2.77524E−02 |
| A7 | 0.00000E+00 | 0.00000E+00 | 0.00000E+00 | 0.00000E+00 | 0.00000E+00 | 0.00000E+00 |
| A8 | −9.25825E−03 | 2.08136E−03 | −5.64439E−03 | 8.11631E−03 | 3.71893E−03 | −6.45708E−03 |
| A9 | 0.00000E+00 | 0.00000E+00 | 0.00000E+00 | 0.00000E+00 | 0.00000E+00 | 0.00000E+00 |
| A10 | 1.40868E−02 | 1.67207E−03 | 2.33083E−03 | −1.95816E−03 | −3.50924E−03 | 9.90447E−04 |
| A11 | 0.00000E+00 | 0.00000E+00 | 0.00000E+00 | 0.00000E+00 | 0.00000E+00 | 0.00000E+00 |
| A12 | −4.95426E−03 | −3.51698E−03 | −7.04525E−04 | 2.38205E−05 | 4.79009E−04 | −8.08914E−05 |

Numerical Example 14

Figure 14:
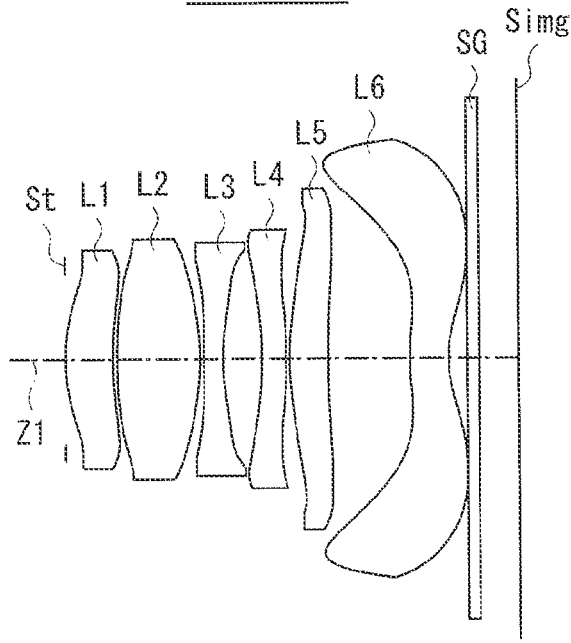
FIG. 14 illustrates a fourteenth configuration example of the image pickup lens and is a lens cross-sectional view corresponding to Numerical Example 14.
Figure 15:
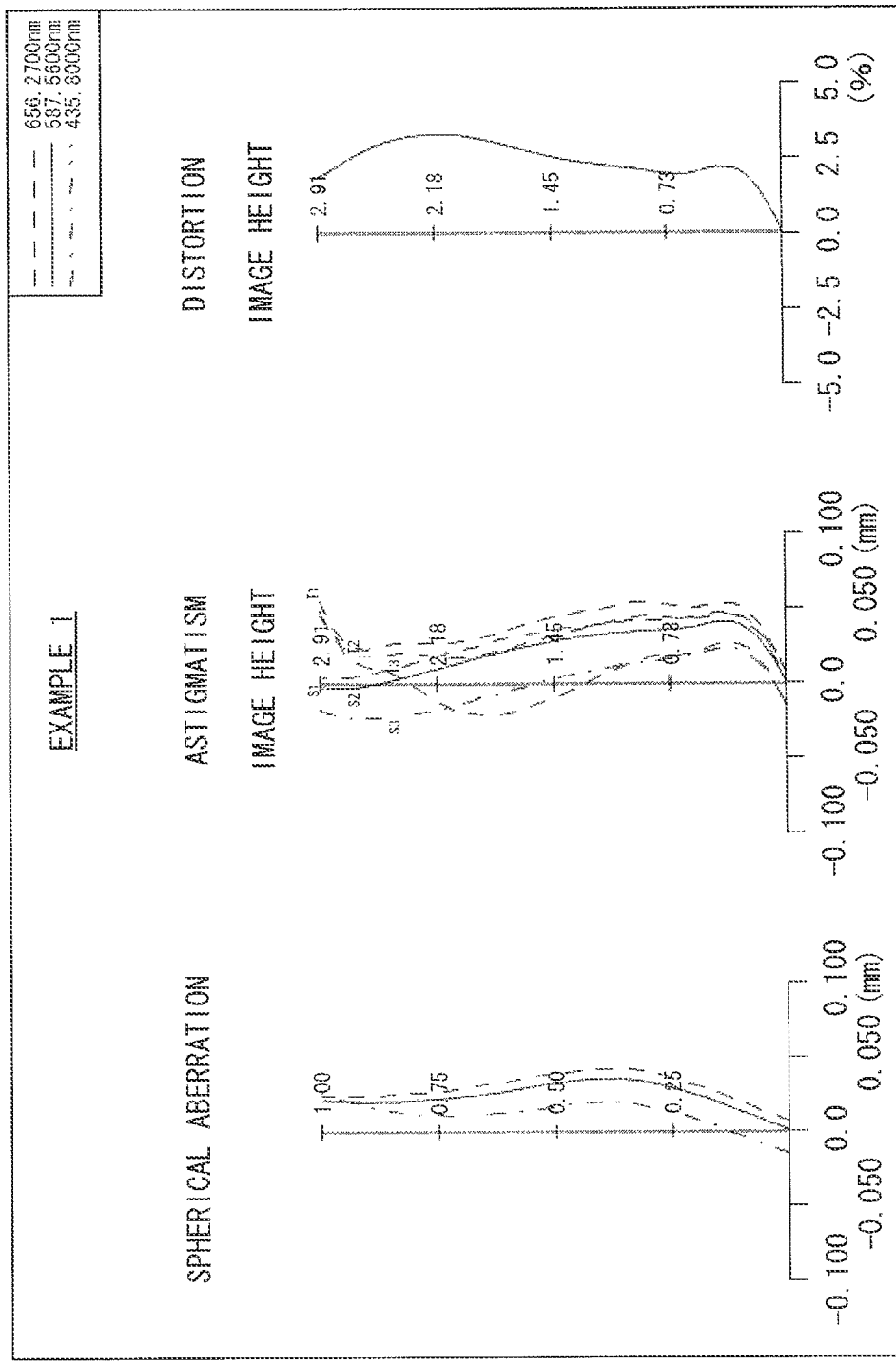
FIG. 15 is an aberration diagram illustrating spherical aberration, astigmatism, and distortion of an image pickup lens corresponding to Numerical Example 1.
Figure 16:
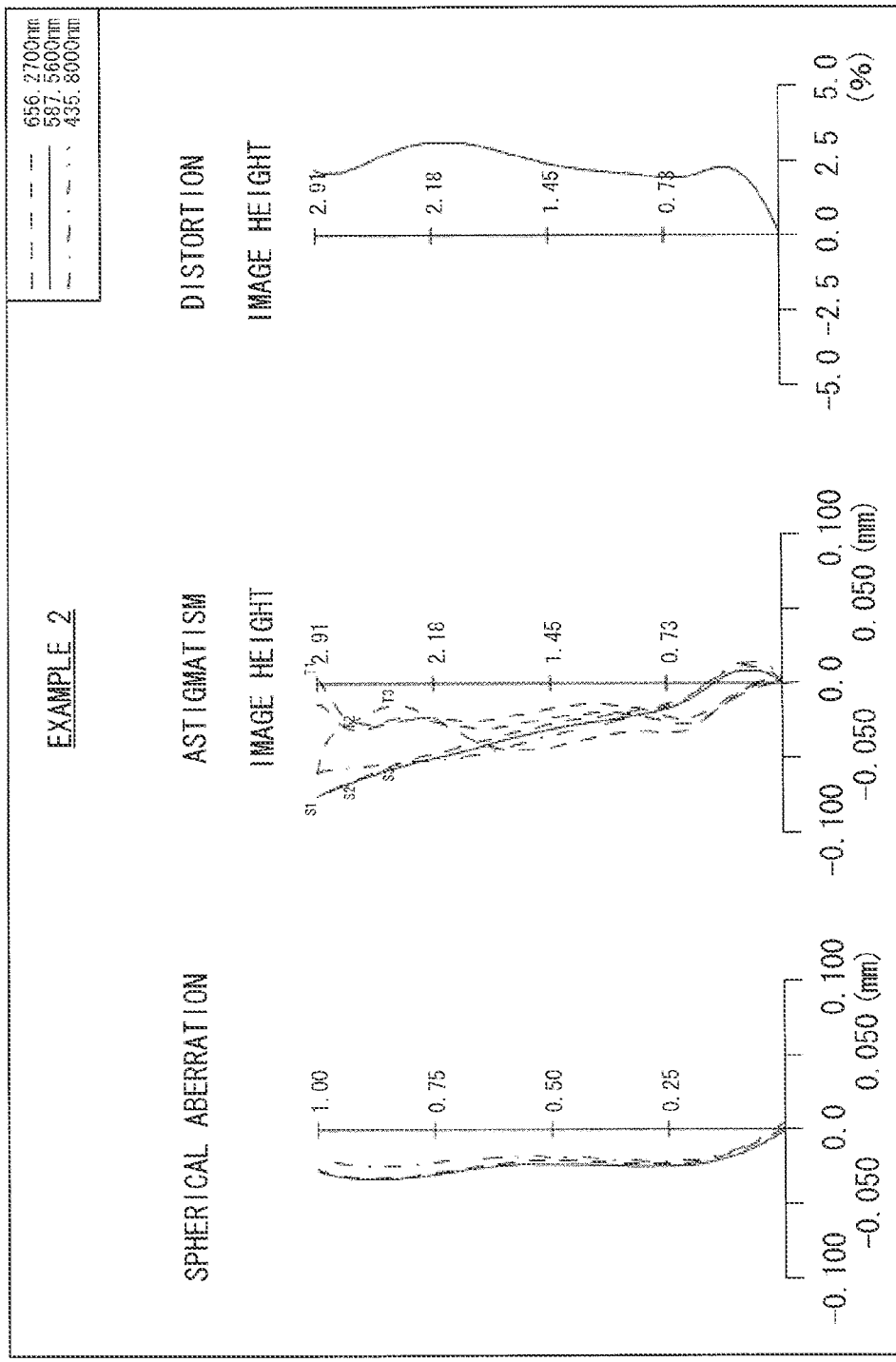
FIG. 16 is an aberration diagram illustrating spherical aberration, astigmatism, and distortion of an image pickup lens corresponding to Numerical Example 2.
Figure 17:
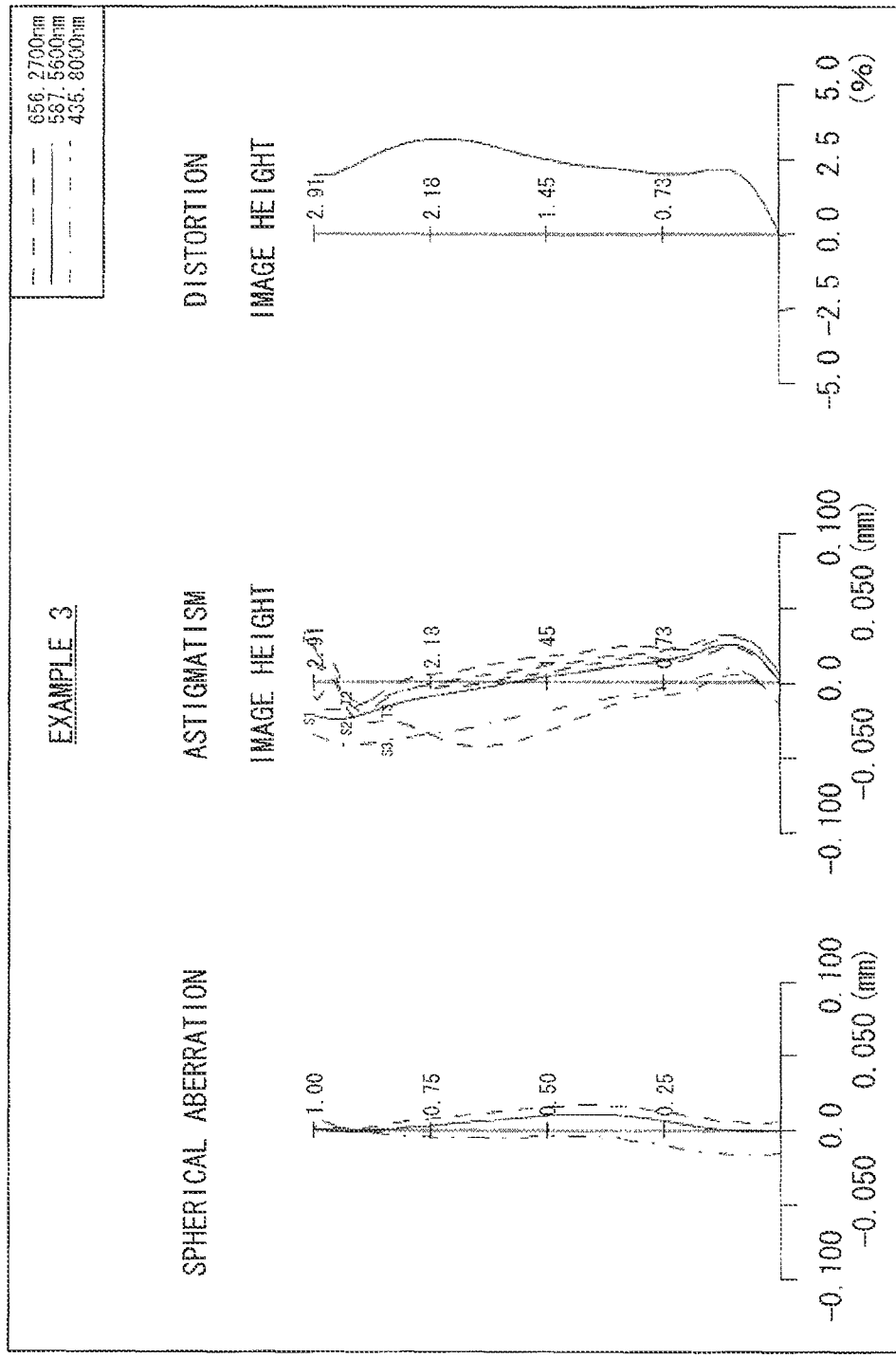
FIG. 17 is an aberration diagram illustrating spherical aberration, astigmatism, and distortion of an image pickup lens corresponding to Numerical Example 3.
Figure 18:
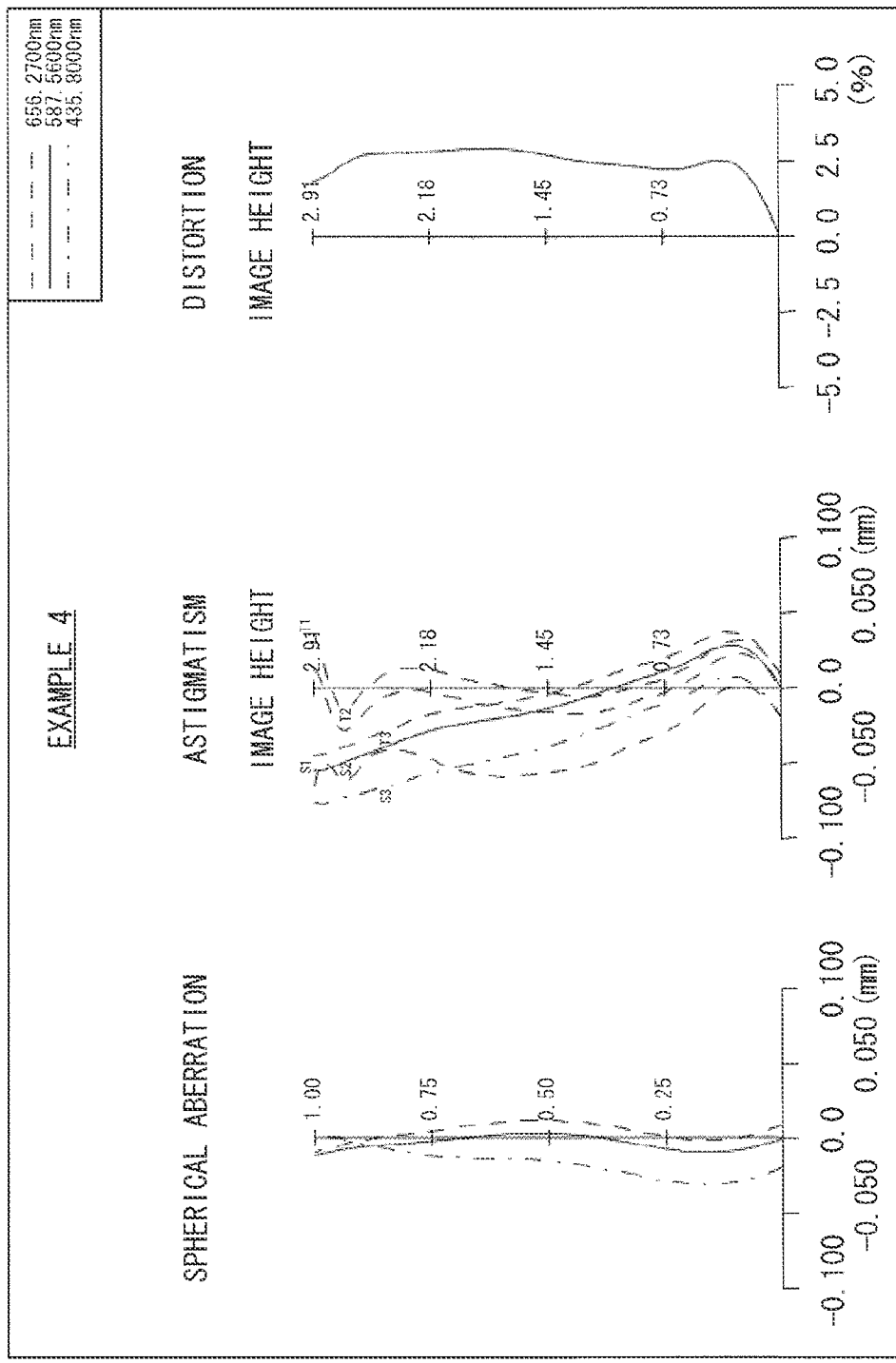
FIG. 18 is an aberration diagram illustrating spherical aberration, astigmatism, and distortion of an image pickup lens corresponding to Numerical Example 4.
Figure 19:
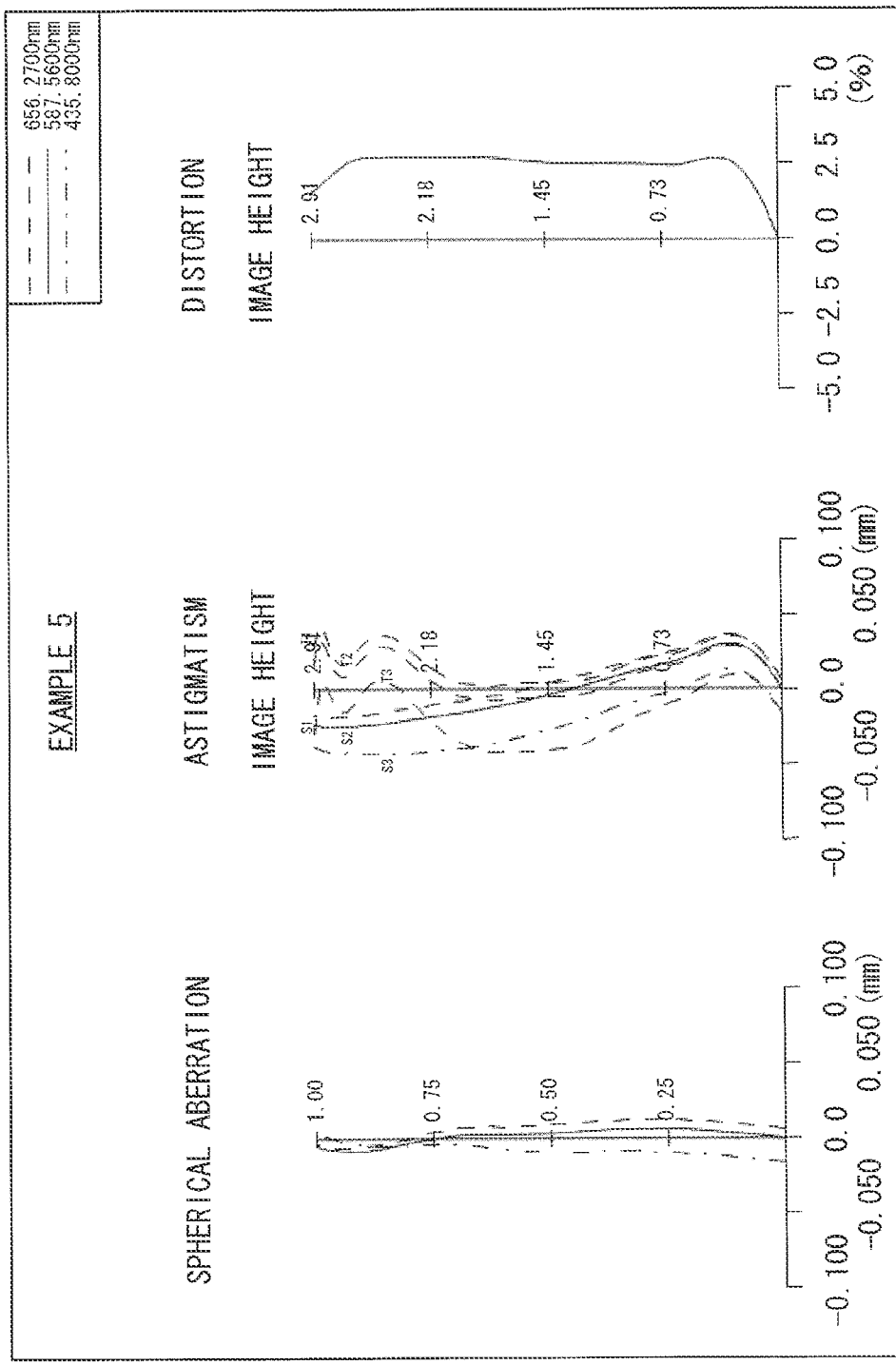
FIG. 19 is an aberration diagram illustrating spherical aberration, astigmatism, and distortion of an image pickup lens corresponding to Numerical Example 5.
Figure 20:
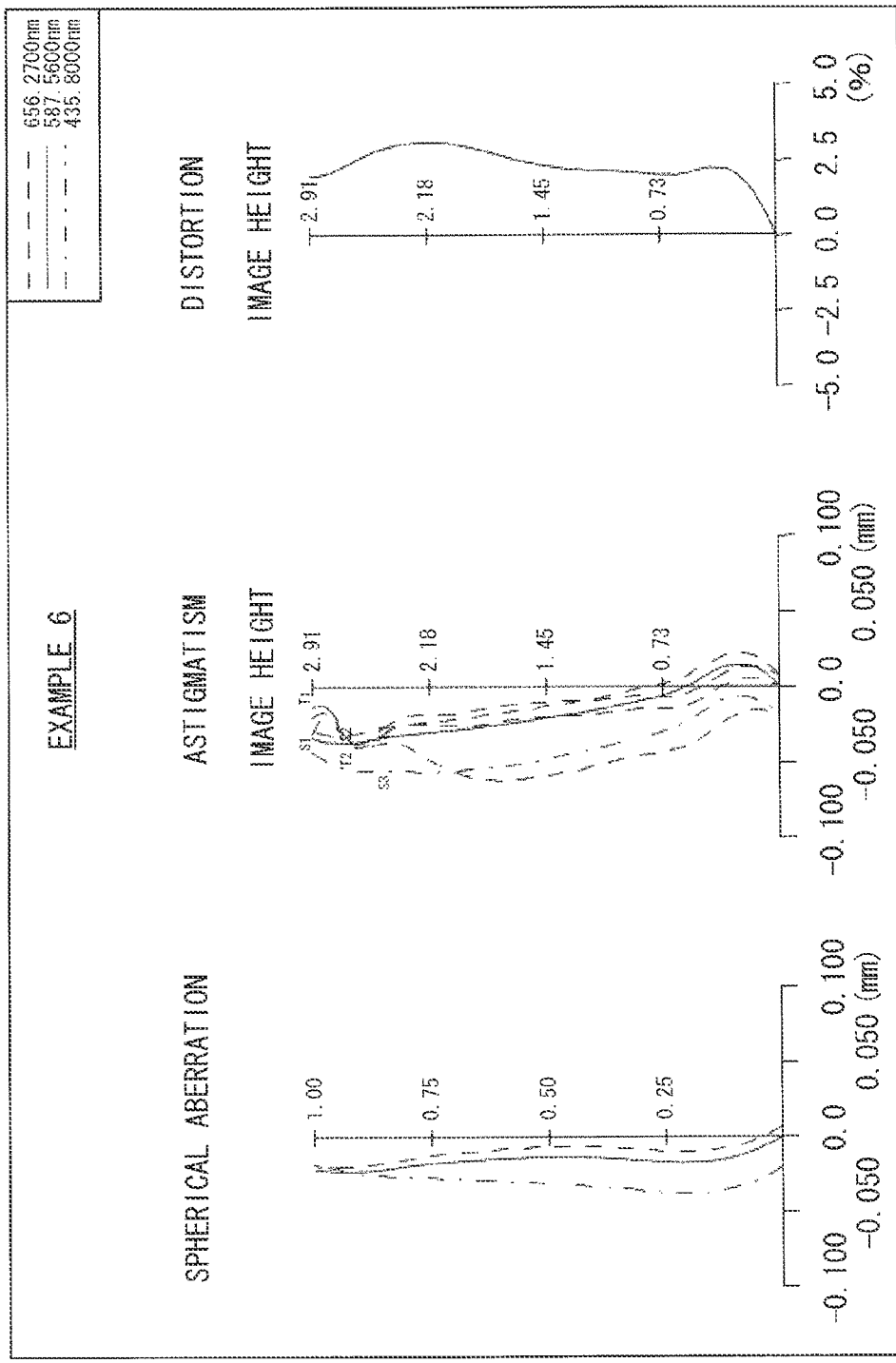
FIG. 20 is an aberration diagram illustrating spherical aberration, astigmatism, and distortion of an image pickup lens corresponding to Numerical Example 6.
Figure 21:
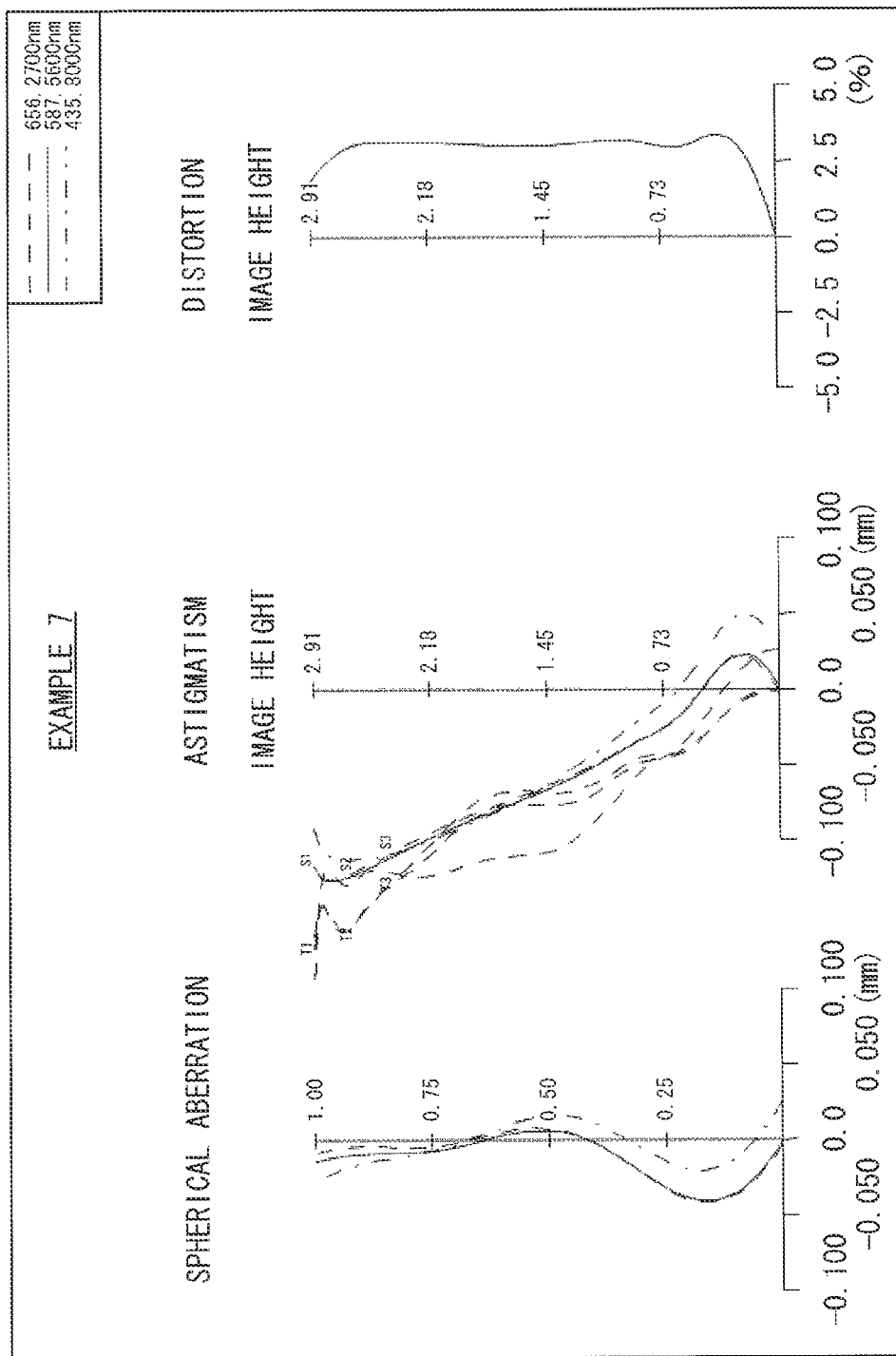
FIG. 21 is an aberration diagram illustrating spherical aberration, astigmatism, and distortion of an image pickup lens corresponding to Numerical Example 7.
Figure 22:
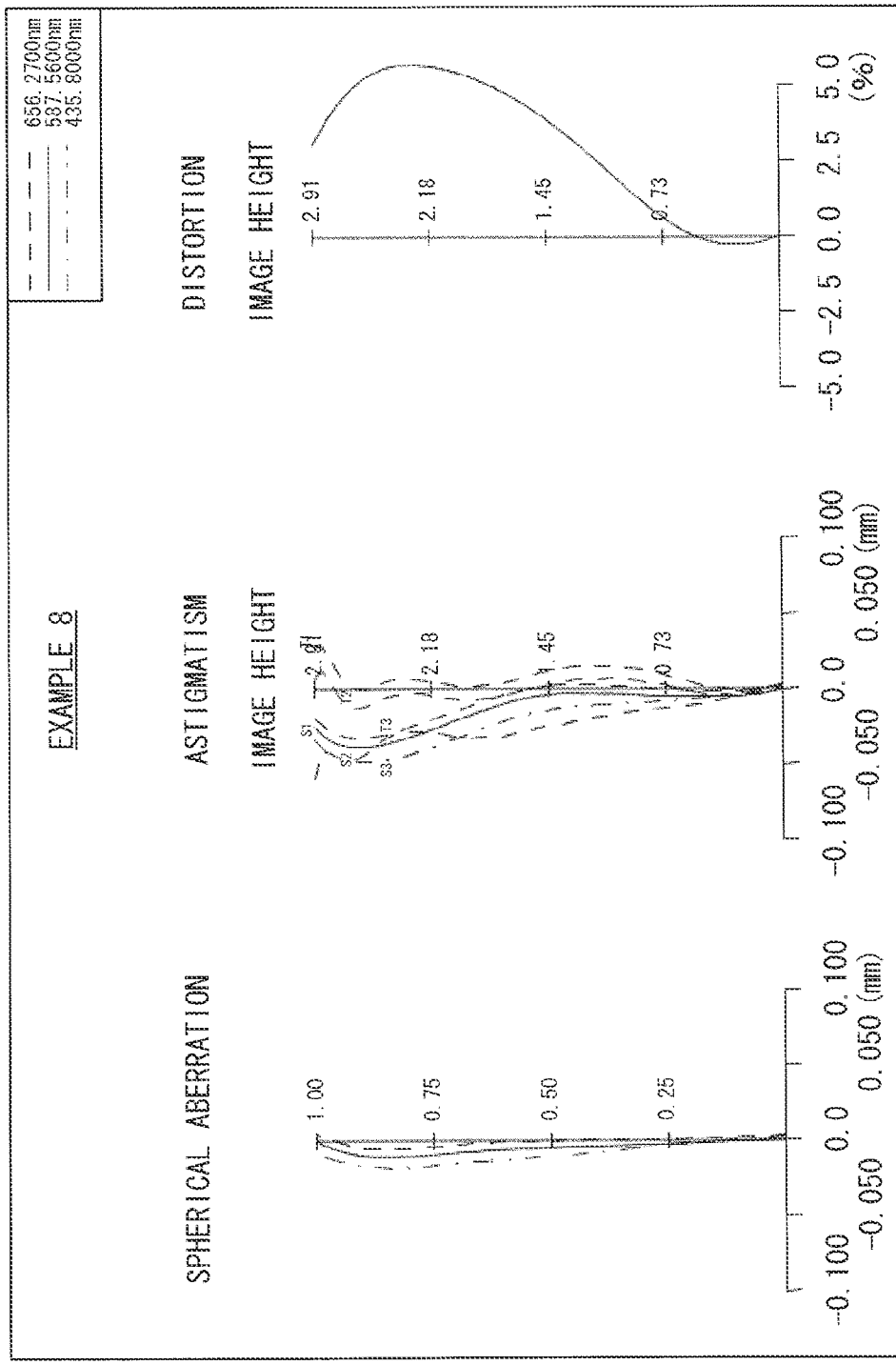
FIG. 22 is an aberration diagram illustrating spherical aberration, astigmatism, and distortion of an image pickup lens corresponding to Numerical Example 8.
Figure 23:
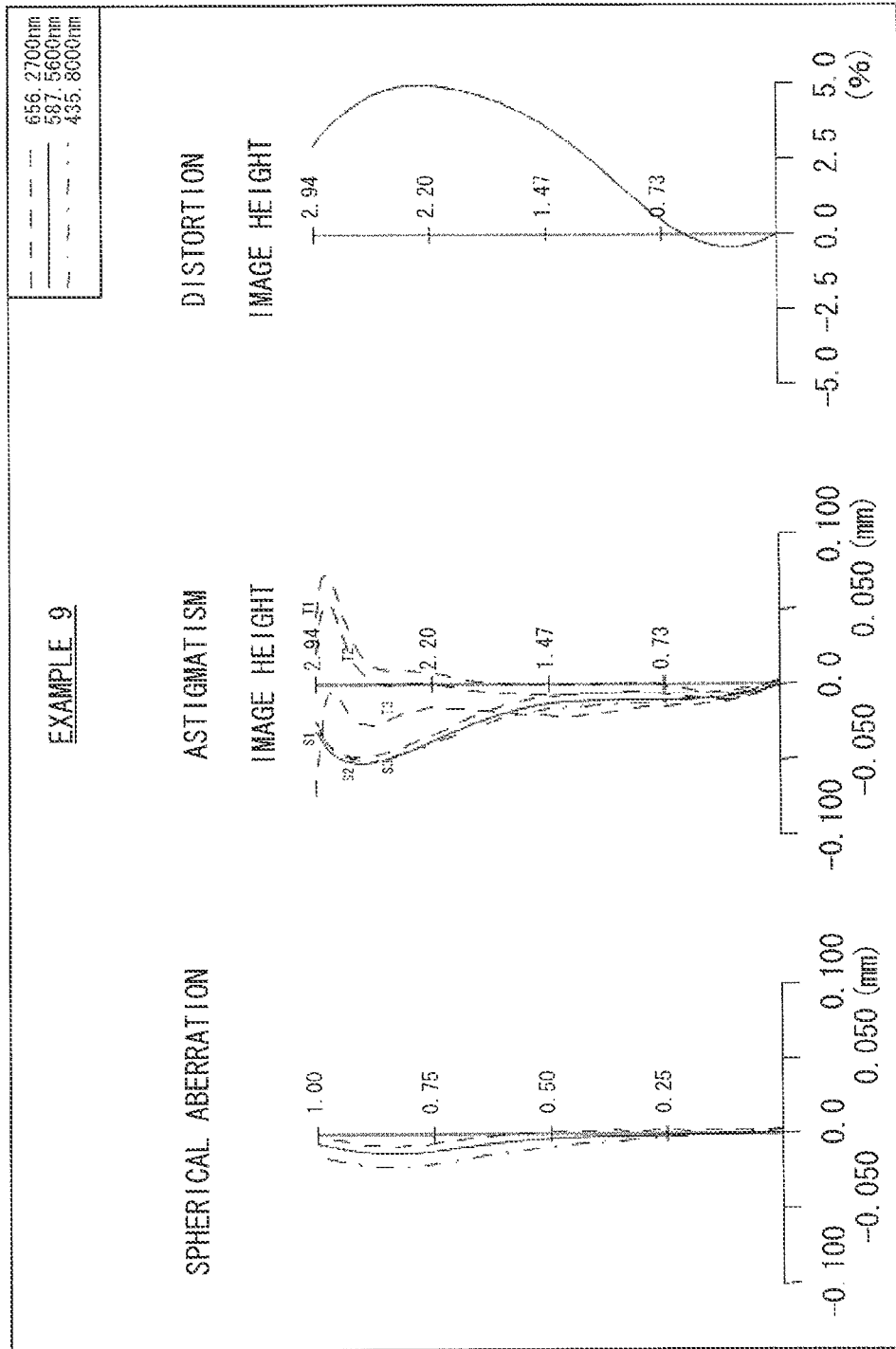
FIG. 23 is an aberration diagram illustrating spherical aberration, astigmatism, and distortion of an image pickup lens corresponding to Numerical Example 9.
Figure 24:
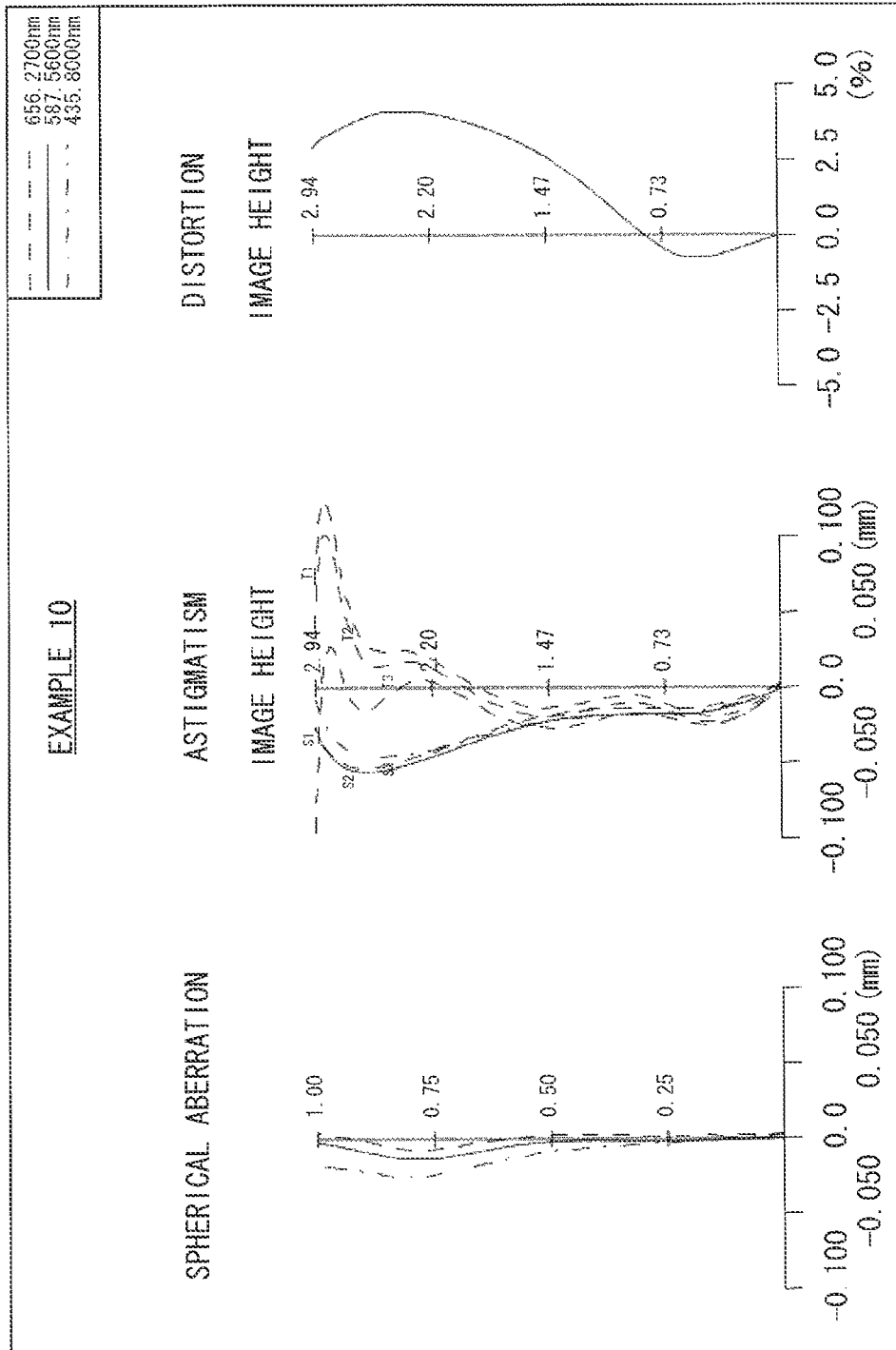
FIG. 24 is an aberration diagram illustrating spherical aberration, astigmatism, and distortion of an image pickup lens corresponding to Numerical Example 10.
Figure 25:
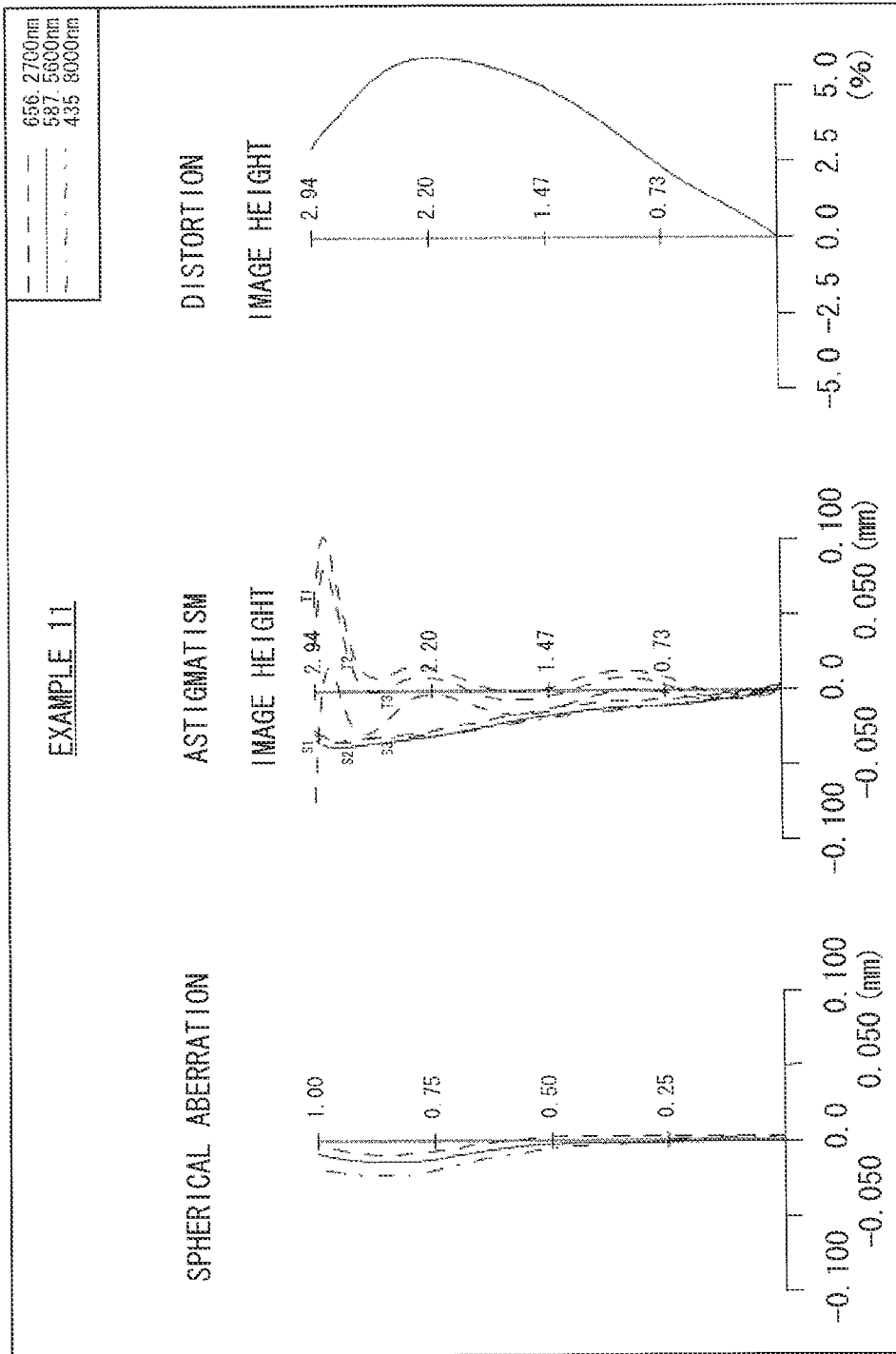
FIG. 25 is an aberration diagram illustrating spherical aberration, astigmatism, and distortion of an image pickup lens corresponding to Numerical Example 11.
Figure 26:
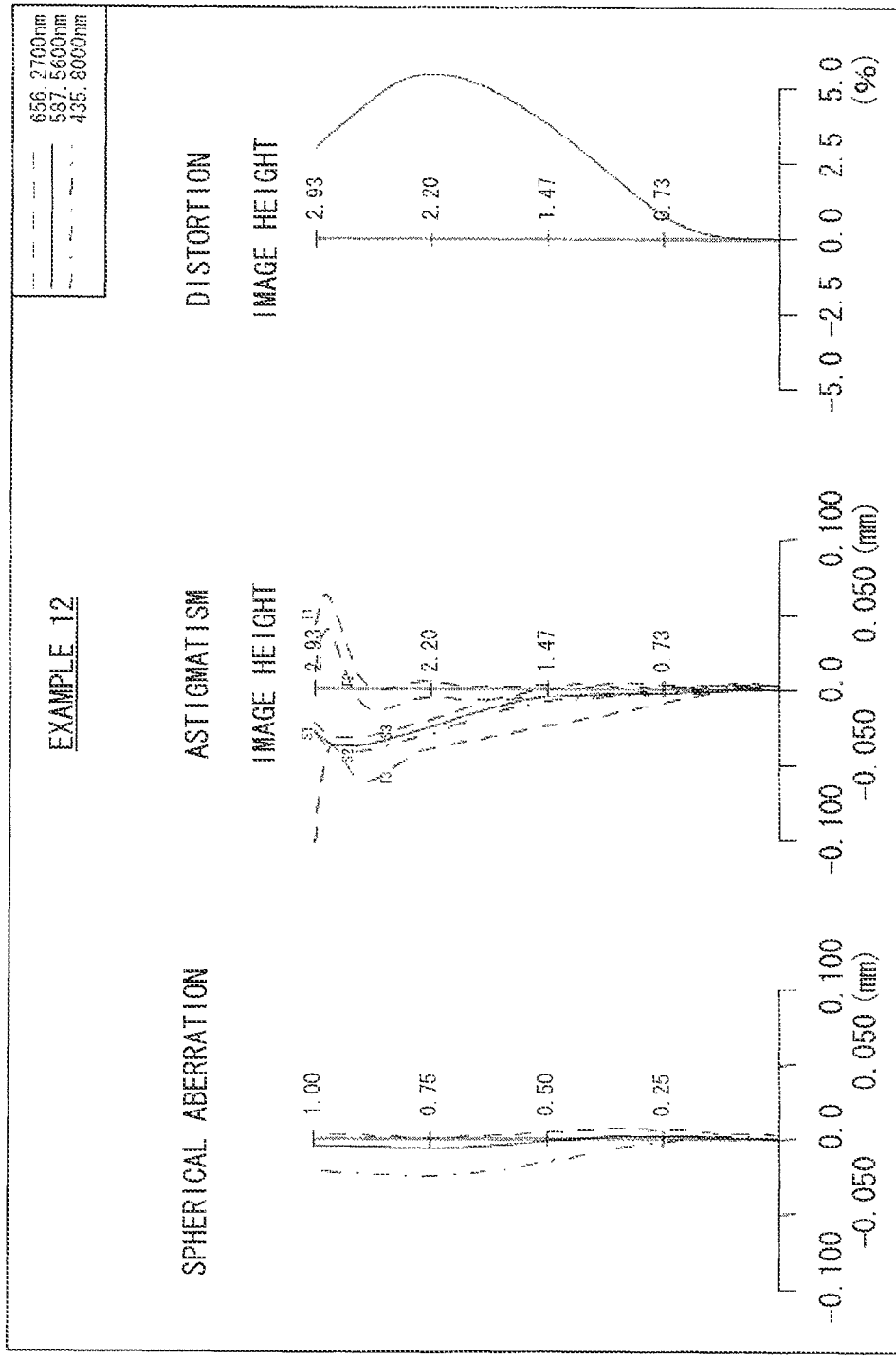
FIG. 26 is an aberration diagram illustrating spherical aberration, astigmatism, and distortion of an image pickup lens corresponding to Numerical Example 12.
Figure 27:
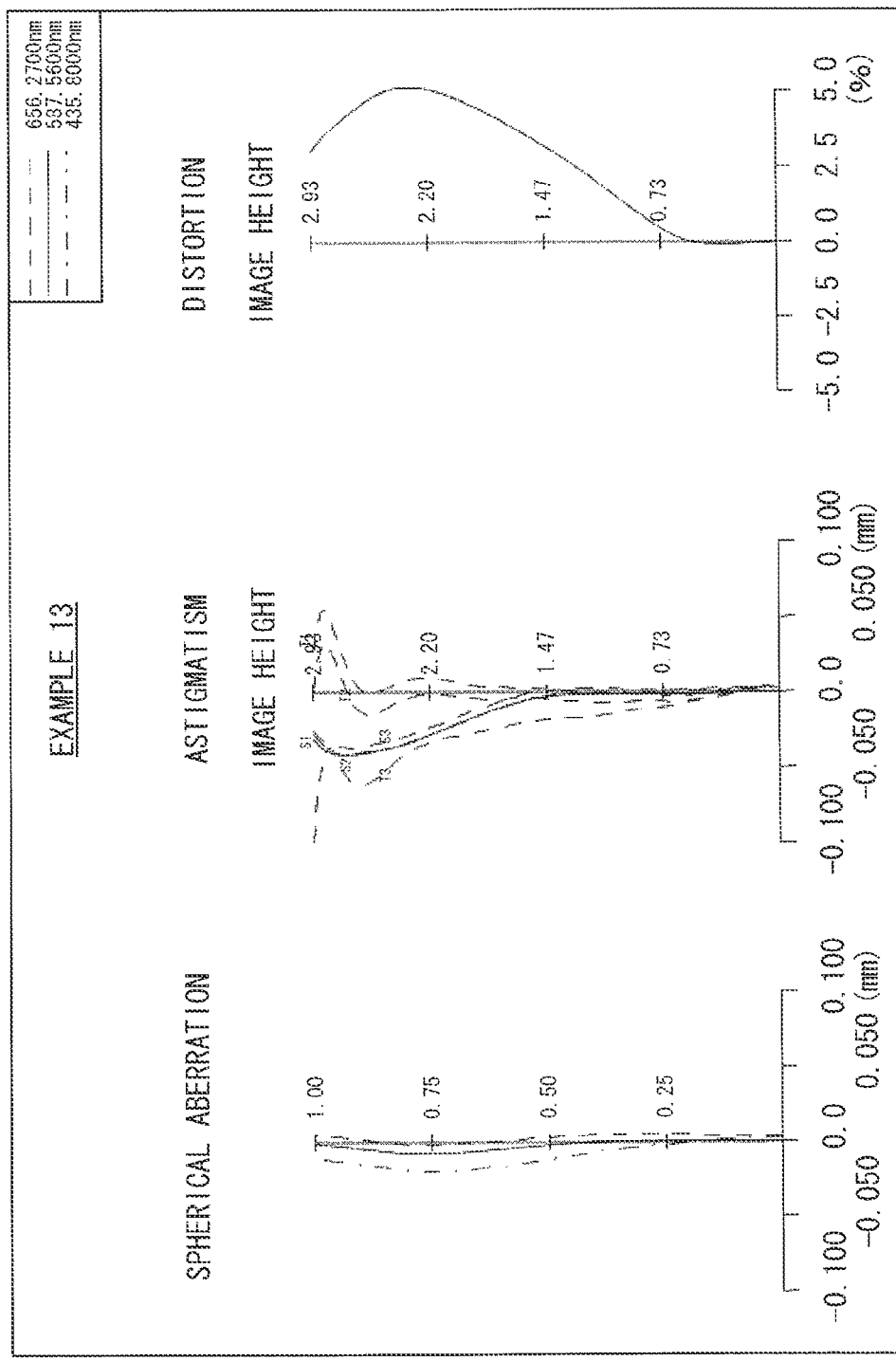
FIG. 27 is an aberration diagram illustrating spherical aberration, astigmatism, and distortion of an image pickup lens corresponding to Numerical Example 13.
Figure 28:
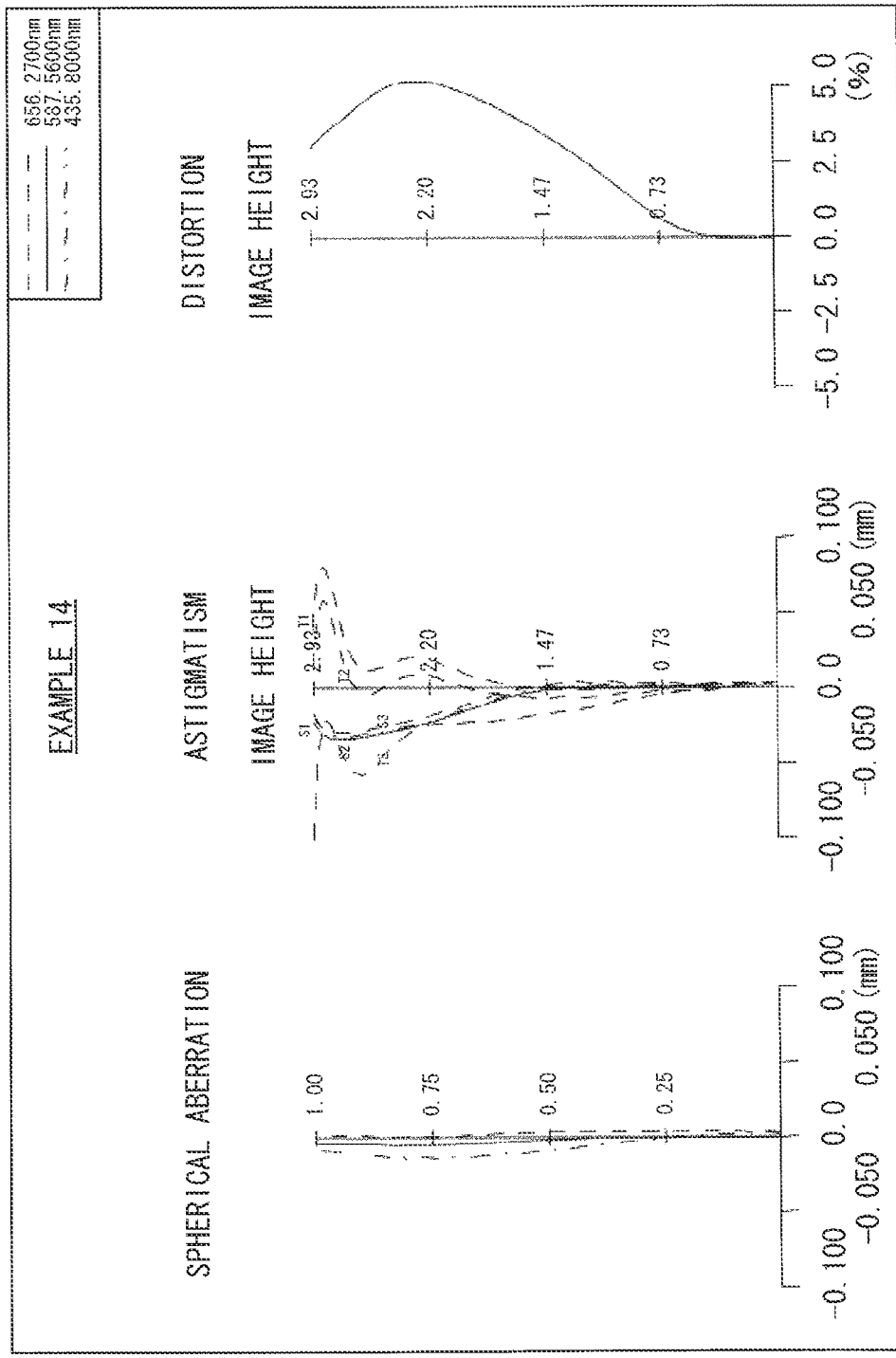
FIG. 28 is an aberration diagram illustrating spherical aberration, astigmatism, and distortion of an image pickup lens corresponding to Numerical Example 14.

[Table 27] and [Table 28] each show specific lens data corresponding to the image pickup lens according to the fourteenth configuration example shown in FIG. 14. In particular, [Table 27] shows basic lens data thereof, and [Table 28] shows data related to the aspherical surfaces. [Table 27] also shows values of Fno, the angle of view 2ω, and the focal length f of the whole system.

In this fourteenth configuration example, the second lens L2 has positive refractive power. The aperture stop St is arranged on the object plane side of the first lens L1. Further, only the second lens L2 in the first lens L1 to the sixth lens L6 is formed of a glass material. Further, the third lens L3 is formed of a material different from that of the fourth lens L4. All of the surfaces in the first lens L1 to the sixth lens L6 are aspherical.

TABLE 27

| Fno | 2.2 |
|---|---|
| f | 3.907 |
| 2ω | 72.272° |

TABLE 27-continued

Example 14 • lens data

| Si | Ri | Di | Ni | νi |
|---|---|---|---|---|
| (aperture) | ∞ | | | |
| 1(ASP) | 1.933 | 0.496 | 1.5305 | 55.70 |
| 2(ASP) | 4.037 | 0.040 | | |
| 3(ASP) | 6.059 | 0.854 | 1.6180 | 63.40 |
| 4(ASP) | −2.308 | 0.040 | | |
| 5(ASP) | −37.884 | 0.200 | 1.6504 | 21.54 |
| 6(ASP) | 2.281 | 0.401 | | |
| 7(ASP) | −3.273 | 0.246 | 1.5305 | 55.70 |
| 8(ASP) | −6.095 | 0.040 | | |
| 9(ASP) | 3.173 | 0.400 | 1.6504 | 21.54 |
| 10(ASP) | 10.723 | 0.841 | | |
| 11(ASP) | 2.388 | 0.400 | 1.5305 | 55.70 |
| 12(ASP) | 1.104 | 0.202 | | |
| 13 | ∞ | 0.110 | 1.5168 | 64.20 |
| 14 | ∞ | 0.407 | | |

TABLE 28

Example 14. aspherical surface data

| coefficient | surface number | | | | | |
|---|---|---|---|---|---|---|
| | 1 | 2 | 3 | 4 | 5 | 6 |
| K | −3.20029E+00 | −7.33190E+00 | −3.00000E+01 | −2.77788E+01 | −3.00000E+01 | −2.81978E+01 |
| A3 | 0.00000E+00 | 0.00000E+00 | 0.00000E+00 | 0.00000E+00 | 0.00000E+00 | 0.00000E+00 |
| A4 | 1.58284E−02 | −2.79061E−03 | 5.54474E−02 | −3.70267E−02 | −6.68899E−02 | −1.72864E−02 |
| A5 | 0.00000E+00 | 0.00000E+00 | 0.00000E+00 | 0.00000E+00 | 0.00000E+00 | 0.00000E+00 |
| A6 | −4.55082E−02 | −6.97490E−02 | −2.43944E−02 | 2.55298E−02 | −1.30094E−02 | −2.18177E−02 |
| A7 | 0.00000E+00 | 0.00000E+00 | 0.00000E+00 | 0.00000E+00 | 0.00000E+00 | 0.00000E+00 |
| A8 | −1.41464E−03 | 1.96141E−02 | 3.34878E−02 | −1.38507E−03 | 3.14038E−02 | 3.80281E−02 |

TABLE 28-continued

Example 14. aspherical surface data

| | | | | | | |
|---|---|---|---|---|---|---|
| A9 | 0.00000E+00 | 0.00000E+00 | 0.00000E+00 | 0.00000E+00 | 0.00000E+00 | 0.00000E+00 |
| A10 | −1.04681E−02 | −1.25130E−02 | −1.87054E−02 | −2.25657E−02 | −1.34841E−02 | −1.24714E−02 |
| A11 | 0.00000E+00 | 0.00000E+00 | 0.00000E+00 | 0.00000E+00 | 0.00000E+00 | 0.00000E+00 |
| A12 | 0.00000E+00 | 0.00000E+00 | 0.00000E+00 | 8.72465E−03 | 7.16342E−03 | 1.92574E−02 |

| coefficient | 7 | 8 | 9 | 10 | 11 | 12 |
|---|---|---|---|---|---|---|
| K | −1.88497E+01 | 5.26896E+00 | −1.32549E+01 | 5.13341E+00 | −3.00000E+01 | −6.89318E+00 |
| A3 | 0.00000E+00 | 0.00000E+00 | 0.00000E+00 | 0.00000E+00 | 0.00000E+00 | 0.00000E+00 |
| A4 | 1.40370E−02 | 2.77977E−03 | −3.40847E−02 | −1.33327E−02 | −2.24658E−01 | −1.00075E−01 |
| A5 | 0.00000E+00 | 0.00000E+00 | 0.00000E+00 | 0.00000E+00 | 0.00000E+00 | 0.00000E+00 |
| A6 | −2.57491E−03 | 4.29620E−02 | 1.98618E−02 | −7.97577E−03 | 4.97811E−02 | 3.07870E−02 |
| A7 | 0.00000E+00 | 0.00000E+00 | 0.00000E+00 | 0.00000E+00 | 0.00000E+00 | 0.00000E+00 |
| A8 | −2.68141E−02 | −4.22532E−03 | −7.38145E−03 | 8.02368E−03 | 3.69136E−03 | −7.46879E−03 |
| A9 | 0.00000E+00 | 0.00000E+00 | 0.00000E+00 | 0.00000E+00 | 0.00000E+00 | 0.00000E+00 |
| A10 | 1.96981E−02 | 7.29221E−04 | 2.39789E−03 | −2.20548E−03 | −3.52210E−03 | 1.13968E−03 |
| A11 | 0.00000E+00 | 0.00000E+00 | 0.00000E+00 | 0.00000E+00 | 0.00000E+00 | 0.00000E+00 |
| A12 | −1.59034E−03 | −1.61833E−03 | −6.22482E−04 | 7.68641E−05 | 4.61947E−04 | −8.97919E−05 |

[Other Numerical Data in Examples]

[Table 29] summarizes values related to the respective conditional expressions described above for each numerical example. As can be seen from [Table 29], the value in each numerical example is within the range of the numerical value in each conditional expression.

TABLE 29

| condition | Example 1 | Example 2 | Example 3 | Example 4 | Example 5 | Example 6 | Example 7 |
|---|---|---|---|---|---|---|---|
| ν3 | 23.89 | 23.89 | 23.89 | 23.89 | 23.89 | 23.89 | 27.03 |
| ν5 | 56.27 | 56.27 | 56.27 | 56.27 | 56.27 | 56.27 | 56.27 |
| f1to2/f | 0.819 | 0.651 | 0.818 | 0.801 | 0.782 | 0.859 | 0.652 |
| f1/f2 | 0.589 | 0.268 | 0.464 | −0.146 | −0.090 | 0.389 | 1.001 |
| f3/f4 | 0.507 | 0.069 | 0.437 | 0.277 | 0.449 | 0.297 | 0.368 |
| (R9 + R10)/(R9 − R10) | 0.200 | 0.473 | 0.194 | 0.567 | 0.332 | 0.231 | 0.008 |
| (R11 + R12)/(R11 − R12) | 0.270 | 0.285 | 0.212 | 0.677 | 0.382 | 0.216 | 0.785 |

| condition | Example 8 | Example 9 | Example 10 | Example 11 | Example 12 | Example 13 | Example 14 |
|---|---|---|---|---|---|---|---|
| ν3 | 21.54 | 21.54 | 21.54 | 21.54 | 21.54 | 21.54 | 21.54 |
| ν5 | 34.33 | 25.2 | 22.1 | 26.6 | 21.54 | 21.54 | 21.54 |
| f1to2/f | 0.659 | 0.616 | 0.583 | 0.607 | 0.547 | 0.534 | 0.561 |
| f1/f2 | 0.425 | 2.197 | 16.905 | 3.146 | 0.953 | 0.899 | 2.296 |
| f3/f4 | 0.341 | 0.305 | 0.545 | 0.544 | 0.090 | 0.206 | 0.239 |
| (R9 + R10)/(R9 − R10) | −2.518 | −1.812 | −1.710 | −1.424 | −2.992 | −2.299 | −1.840 |
| (R11 + R12)/(R11 − R12) | 3.255 | 2.934 | 2.907 | −1.061 | 2.688 | 2.800 | 2.721 |

[Aberration Performance]

FIGS. 15 to 28 each show aberration performance in each numerical example. In each drawing, spherical aberration, astigmatism, and distortion are shown as aberration diagrams. In the astigmatism diagram, S indicates aberration in a sagittal direction and T indicates aberration in a meridional (tangential) direction.

As can be seen from each aberration diagram described above, an image pickup lens in which aberration is favorably corrected is achieved in each example.

5. Other Embodiments

The technology according to the present disclosure is not limited to the description above of the embodiment and the examples, and may be variously modified. For example, all shapes and numeral values of each section shown in the above-described numerical examples are mere examples to carry out the present technology, and the technical scope of the present technology should not be construed limitedly based thereon.

Moreover, in the above-described embodiment and examples, description has been given of the configuration substantially configured of six lenses. However, a configuration that further includes a lens having substantially no refractive power may be adopted.

It is possible to achieve at least the following configurations from the above-described example embodiment of the disclosure.

(1) An image pickup lens including:
in recited order from object plane toward image plane,
a first lens having positive refractive power;
a second lens having positive or negative refractive power;
a third lens having negative refractive power;
a fourth lens having negative refractive power;
a fifth lens having positive refractive power; and
a sixth lens having negative refractive power and having optical surfaces, an image-sided surface of the optical surfaces having an aspherical shape with one or more inflection points other than an intersection point of the image-sided surface and an optical axis.

(2) The image pickup lens according to (1), wherein following conditional expression is satisfied, $$14 \leq \nu3 \leq 35 \qquad (1)$$

where ν3 is an Abbe number of the third lens.

(3) The image pickup lens according to (1) or (2), wherein following conditional expression is satisfied, $$20 \leq v5 \leq 60 \quad (2)$$

where v5 is an Abbe number of the fifth lens.

(4) The image pickup lens according to any one of (1) to (3), wherein following conditional expression is satisfied, $$0.4 \leq f1to2/f \leq 1.0 \quad (3)$$

where f is a total focal length of the image pickup lens, and f1to2 is a combined focal length of the first lens and the second lens.

(5) The image pickup lens according to any one of (1) to (4), wherein following conditional expression is satisfied, $$-1 \leq f1/f2 \leq 30 \quad (4)$$

where f1 is a focal length of the first lens, and f2 is a focal length of the second lens.

(6) The image pickup lens according to any one of (1) to (5), wherein following conditional expression is satisfied, $$0 \leq f3/f4 \leq 1.0 \quad (5)$$

where f3 is a focal length of the third lens, and f4 is a focal length of the fourth lens.

(7) The image pickup lens according to any one of (1) to (6), wherein following conditional expression is satisfied, $$-10 \leq (R9+R10)/(R9-R10) \leq 1 \quad (6)$$

where R9 is a radius of curvature of an object-sided surface of the fifth lens, and R10 is a radius of curvature of an image-sided surface of the fifth lens.

(8) The image pickup lens according to any one of (1) to (7), wherein following conditional expression is satisfied, $$-5 \leq (R11+R12)/(R11-R12) \leq 10 \quad (7)$$

where R11 is a radius of curvature of an object-sided surface of the sixth lens, and R12 is a radius of curvature of an image-sided surface of the sixth lens.

(9) The image pickup lens according to any one of (1) to (8), further including an aperture stop arranged on an object-plane side of the first lens or between the first lens and the second lens.

(10) The image pickup lens according to any one of (1) to (9), wherein all of the first to sixth lenses are formed of plastic material, or only the first lens or the second lens in the first to sixth lenses is formed of glass material.

(11) The image pickup lens according to any one of (1) to (10), wherein the third lens is formed of a material same as a material of the fourth lens.

(12) The image pickup lens according to any one of (1) to (11), further including a lens substantially having no refractive power.

(13) An image pickup unit with an image pickup lens and an image pickup device outputting an image pickup signal based on an optical image formed by the image pickup lens, the image pickup lens including:

in recited order from object plane toward image plane,
a first lens having positive refractive power;
a second lens having positive or negative refractive power;
a third lens having negative refractive power;
a fourth lens having negative refractive power;
a fifth lens having positive refractive power; and
a sixth lens having negative refractive power and having optical surfaces, an image-sided surface of the optical surfaces having an aspherical shape with one or more inflection points other than an intersection point of the image-sided surface and an optical axis.

(14) The image pickup unit according to (13), the image pickup lens further including a lens substantially having no refractive power.

The present application contains subject matter related to that disclosed in Japanese Priority Patent Application JP 2012-187995 filed in the Japan Patent Office on Aug. 28, 2012, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. An image pickup lens comprising:
in recited order from an object plane towards an image plane,
a first lens having positive refractive power;
a second lens having positive or negative refractive power;
a third lens having negative refractive power;
a fourth lens having negative refractive power;
a fifth lens having positive refractive power and a biconvex shape; and
a sixth lens having negative refractive power and having optical surfaces, an image-sided surface of the optical surfaces having an aspherical shape with one or more inflection points other than an intersection point of the image-sided surface and an optical axis,
wherein following conditional expression is satisfied, $$0 \leq f3/f4 \leq 1.0 \quad (1)$$

where f3 is a focal length of the third lens, and f4 is a focal length of the fourth lens.

2. The image pickup lens according to claim 1, wherein following conditional expression is satisfied, $$14 \leq v3 \leq 35 \quad (2)$$

where v3 is an Abbe number of the third lens.

3. The image pickup lens according to claim 1, wherein following conditional expression is satisfied, $$20 \leq v5 \leq 60 \quad (3)$$

where v5 is an Abbe number of the fifth lens.

4. The image pickup lens according to claim 1, wherein following conditional expression is satisfied, $$0.4 \leq f1to2/f \leq 1.0 \quad (4)$$

where f is a total focal length of the image pickup lens, and f1to2 is a combined focal length of the first lens and the second lens.

5. The image pickup lens according to claim 1, wherein following conditional expression is satisfied, $$-1 \leq f1/f2 \leq 30 \quad (5)$$

where f1 is a focal length of the first lens, and f2 is a focal length of the second lens.

6. The image pickup lens according to claim 1, wherein following conditional expression is satisfied, $$-10 \leq (R9+R10)/(R9-R10) \leq 1 \quad (6)$$

where R9 is a radius of curvature of an object-sided surface of the fifth lens, and R10 is a radius of curvature of an image-sided surface of the fifth lens.

7. The image pickup lens according to claim 1, wherein following conditional expression is satisfied, $$-5 \le (R11+R12)/(R11-R12) \le 10 \qquad (7)$$

where R11 is a radius of curvature of an object-sided surface of the sixth lens, and
R12 is a radius of curvature of an image-sided surface of the sixth lens.

8. The image pickup lens according to claim 1, further comprising an aperture stop arranged on an object-plane side of the first lens or between the first lens and the second lens.

9. The image pickup lens according to claim 1, wherein all of the first to sixth lenses are formed of plastic material, or only the first lens or the second lens in the first to sixth lenses is formed of glass material.

10. The image pickup lens according to claim 1, wherein the third lens is formed of a material same as a material of the fourth lens.

11. An image pickup unit with an image pickup lens and an image pickup device outputting an image pickup signal based on an optical image formed by the image pickup lens, the image pickup lens comprising:

in recited order from an object plane towards an image plane,
a first lens having positive refractive power;
a second lens having positive or negative refractive power;
a third lens having negative refractive power;
a fourth lens having negative refractive power;
a fifth lens having positive refractive power; and
a sixth lens having negative refractive power and having optical surfaces, an image-sided surface of the optical surfaces having an aspherical shape with one or more inflection points other than an intersection point of the image-sided surface and an optical axis,
wherein following conditional expression is satisfied, $$0 \le f3/f4 \le 1.0 \qquad (1)$$

where f3 is a focal length of the third lens, and
f4 is a focal length of the fourth lens.

* * * * *